(12) United States Patent
James

(10) Patent No.: US 7,412,413 B2
(45) Date of Patent: Aug. 12, 2008

(54) COMPUTERISED FINANCIAL SERVICES METHOD

(75) Inventor: Paul J. James, London (GB)

(73) Assignee: Enterprise Value Limited (GB)

( * ) Notice: Subject to any disclaimer, the term of this patent is extended or adjusted under 35 U.S.C. 154(b) by 1465 days.

(21) Appl. No.: 10/183,494

(22) Filed: Jun. 28, 2002

(65) Prior Publication Data

US 2003/0036988 A1 Feb. 20, 2003

Related U.S. Application Data

(63) Continuation-in-part of application No. PCT/GB01/03948, filed on Sep. 4, 2001.

(30) Foreign Application Priority Data

Sep. 4, 2000 (GB) .................................... 0021653

(51) Int. Cl.
*G06Q 40/00* (2006.01)
(52) U.S. Cl. .......................................... 705/35; 705/30
(58) Field of Classification Search .............. 705/35–37
See application file for complete search history.

(56) References Cited

U.S. PATENT DOCUMENTS 6,154,731 A * 11/2000 Monks et al. ............. 705/36 R

OTHER PUBLICATIONS

Brown, Australian CPA, Looking at EVA, 1999.*
James A. Ohlson, "Residual Income Valuation: The Problems", Stern School of Business, New York University, Mar. 2000.
Fredrik Weissenrieder, "Value Based Management: Economic Value Added or Cash Value Added?", Gothenburg Studies in Financial Economics, Study No. 1997:3, 1998.
Pablo Fernandez, "EVA, Economic profit and Cash value added do not measure shareholder value creation", IESE business School, May 22, 2001.
Gary Ashworth and Paul James, "Value Based Management: Delivering Superior Shareholder Value", Financial Times Prentice Hall, 2001, at pp. 7-9, 18-39, 139-147, 149-154.

* cited by examiner

*Primary Examiner*—Richard Weisberger
(74) *Attorney, Agent, or Firm*—Dickstein, Shapiro, LLP.

(57) ABSTRACT

A method of determining a measure of residual income in relation to a company or investment, comprises first determining the forecast earnings or cash flow stream (E) of the company or investment for at least one time period (t) in the future, and deducting from this a charge (CC) for the mean cost of capital employed. The charge (CC) for the cost of capital employed is based not upon balance-sheet values, but rather upon a value of enterprise value (EV). The value of enterprise value (EV) is determined by adding the value of debt (VOD) and adjustments (ADJ), if any, to the current market capitalization (MC) of the company or investment. A measure (EV+) of residual income (RI) is thereby obtained as EV+=E−CC. A warranted enterprise value can be obtained by summing the present values of the residual income for a plurality of future years, with the present value of the difference between the terminal value and the present enterprise value, and the present enterprise value itself. Various subsidiary metrics can be developed from the residual income measure obtained.

Instead of using enterprise value, the market capitalization (MC) can be used. In this case the interest rate used to calculate the cost of capital is the cost of equity capital only, and the cash flow/earnings used are taken after deduction of interest paid.

27 Claims, 16 Drawing Sheets

Figure 8

STEP 8.10 — RETRIEVE SELECTED SUBSIDIARY VALUATION METRICS (SUCH AS THE METRIC PRODUCED IN STEP 6.50) FOR A NUMBER OF COMPANIES

STEP 8.20 — RETRIEVE AGGREGATES OF THE SAME METRICS (SUCH AS THAT PRODUCED IN STEP 7.20)

STEP 8.30 — SORT AND LIST IN TABLE OR CHART

COMPUTERISED FINANCIAL SERVICES METHOD

CROSS-REFERENCE TO RELATED APPLICATION

This application is a continuation-in-part of my International Application number PCT/GB01/03948, with the International filing date of Sep. 4, 2001, and publication number WO 02/23418.

BACKGROUND OF THE INVENTION

This invention relates to a computerised method for valuing shares for use in identifying whether they are overvalued or undervalued, and to apparatus and programs for use in the method.

The valuation of entire businesses (known as "enterprise" or "entity" value) and groups of companies is an important tool in measuring the worth of their shares on the stockmarkets. It is also important in identifying whether current share prices are too high or too low.

Professional investors and investment advisors use computerised information systems to retrieve data and forecasts about individual companies. They also use computerised systems to value shares and groups of shares.

Background—Computerised Share Valuation &, Information Systems

There are many different types of system used by professional investors. However their aim is similar, namely to assist with the valuation of shares and the management of portfolios of shares. To do this they use a wide variety of data which helps them to predict the likely price of their investments in the future and to establish whether they should buy or sell the shares in a particular company (or corporation).

There are also a number of organisations that provide data to professional investors. These companies are known as "estimate" or "forecast" providers. Two well-known companies are First Call and I/B/E/S International (both now merged as part of the Thomson Financial group of companies), both of which collect from share analysts and brokers their forecasts relating to the future performance of companies. Other similar companies include Multex, Zacks and JCF.

Having collected broker forecasts these estimate providers then use computer systems to manipulate and present this data in a variety of ways. This is stored in databases which are then sold either directly to investment fund managers (along with the software needed to manipulate and extract the information) or indirectly through the systems of other information providers such as Factset and Reuters, who have their own manipulation and reporting software.

The use of computers is essential in modern investment. For example, I/B/E/S carries data for approximately 18,000 companies in 56 countries For each of these 18,000 companies they collect, store and manipulate numerous different forecast data items for up to 5 different years.

Share price indices also rely on computers; the Dow Jones and FTSE index are recalculated continuously. Investment fund managers and analysts regularly perform complex calculations on their own specific share portfolios, which could not be done without computerised valuation and management systems.

Background—Enterprise Value (EV)

In the investment community one valuation measure in common use is called Enterprise (or Entity) Value (EV). This measure represents the market value of the capital the company uses within the business. It consists of the following components.

The most important component is market capitalisation, which is the price an investor would need to pay in order to buy all the issued shares of the company at today's share price. Effectively this is the market value of the equity (or share) capital of the company, that is, the number of shares multiplied by the share price.

The second component is the value of the debt capital within the company. This is the long term borrowing of the company.

The third component is optional and represents adjustments to the first two components. Different people adjust Enterprise Value in different ways. For example, some make adjustments to cash, others to pension fund liabilities, and some for assets that are not key to the operational performance of the business.

The above can be summarised by the expression:

$$EV = MC + VOD + ADJ$$

where MC is market capitalisation, VOD is the value of debt, and ADJ represents any adjustments.

Whether or not adjustments are made, the rationale behind EV is however the same, namely to establish the market value of the capital employed within the entire company.

Background—Valuations Based on Enterprise Value

To aid the comparison of the values of different companies, EV is often expressed as part of a ratio, such as EV/Sales or EV/Cash-flow. The use of EV-based ratios enables one company to be compared with another. For example company A may have an EV of $1 million and company B may have an EV of $100 million. As such their performance and values are difficult to compare. But if the sales of company A are $500,000 and of company B are $10 million then the ratios of EV/Sales for these companies are 2:1 for company A and 10:1 for company B. In other words, for every dollar of capital invested in these organisations, company A generates 50 cents of sales but company B only generates 10 cents. So company A, although smaller, may be a better investment than company B. Looking at it another way, company A may be argued to be undervalued and company B may be overvalued.

Background—Discounted Cash Flow

For many years investors have realised that $1 received in one year's time is worth less than $1 received today. They recognise that money has a "time value" and that interest is earned to compensate for that time value. So $100 invested for one year at 10% interest may be worth $110 in one year's time. The interest rate is often expressed as the "cost of capital" invested. Another way of looking at this is that, at a cost of capital of 10%, the worth today of $110 received in one year's time is $100 ($110/1.1=$100). This $100 figure is known as the "present value" or PV of the $110 receipt in one year's time. We have "discounted" the future cash flow in order to arrive at this present value—hence the term discounted cash flow or DCF.

The PV of a sum received in period "n" is therefore defined as:

$$PV = \frac{\text{earnings/cash - flows in period "}n\text{"}}{(1 + \text{interest "}i\text{"})^n}$$

where "i" is the interest rate expressed as a decimal, and "n" is a variable number of years in the future.

The method (also known as NPV or net present value) can apply to receipts in any particular year. So the present value of $121 received in 2 year's time is also $100 if we discount using a 10% cost of capital; that is $121/(1.1)$^2$.

If moneys are received in more than one year the PV will be the sum of the receipts, suitably discounted. So the PV of $110 received at the end of year one and $121 received at the end of year two, using a 10% cost of capital will be $200; namely $110/1.1 plus $121/(1.1)$^2$.

This DCF method has been used as one of the ways of valuing the shares of companies for many years. In this case the receipts are the stream of dividends paid by the company to its shareholders. This is known as the Dividend Discount Model (DDM). Variants of the model have also been developed to reflect growth in the dividend stream.

The DDM has also been modified to reflect the fact that some companies do not pay dividends. The amended models uses the earnings or cash generated by the company in each accounting period, instead of the dividends it pays. The rationale is that the company could pay these amounts as dividends but may choose not to in order to reinvest for the future.

The current theory of company valuation using DCF is summarised in Bartley J. Madden's book "CFROI Valuation" (Cash Flow Return On Investment) Butterworth-Heinemann Finance, 1999, ISBN 0 7506 3865 6. He states on page 9 that "the firm's warranted value is driven by a forecast net cash receipt (NCR) stream which is translated into a present value by use of the investor's discount rate".

In theory the forecasts for the net cash receipt stream (also known as "free cash flow" or FCF) should continue to infinity. In practice such forecasts tend to be for a limited number of years so, in order to compensate for the lack of forecasts beyond the horizon, a "terminal value" (TV) is often substituted into the formula at time "n", the date at which forecasts finish.

We have appreciated that the forecasts produced by estimate providers can be of direct use in the calculation of share valuations using the DCF or NPV method.

Background—Economic Profit and EVA

Stern Stewart a co, of New York, USA, have commercialised a particular version of economic profit which they have trademarked as EVA, economic value added. This is defined as earnings less a charge for the book value of capital invested at the beginning of each period. The charge is calculated using cost of capital and it is based on balance-sheet or accounting values, suitably adjusted in accordance with Stern Stewart's methods.

Adjustments that may be made include for example: capitalising research and development and long-term marketing expenses and depreciating them over future periods; adding acquired goodwill into the capital employed number (where this has not been followed in the normal accounting policies of the company); changing the method of depreciation; and capitalising leases and treating them as if the assets had been purchased and the money borrowed.

So, the initial adjusted balance-sheet value is used when measuring the EVA for period 1. However when measuring the EVA for period 2 a different figure is used.

Background—Residual Income (RI)

EVA is an example of a well-known technique called residual income valuation, which uses DCF methods but which also deducts an interest charge to cover the cost of capital from the earnings for each period considered. There are however problems with the existing RI techniques, some of which are described in a paper by James A. Ohlson "Residual Income Valuation: The Problems", Stern School of Business, New York University, New York City, N.Y. 10012, USA; March 2000.

We have appreciated that one particular problem is that the existing RI techniques are optimised for corporate use and do not provide optimum results for an investor in the company. Furthermore, the existing commercial RI models necessitate complex adjustments.

SUMMARY OF THE INVENTION

The invention in its various aspects is defined in the independent claims appended to this description, to which references should now be made. Advantageous features of the invention are set forth in the appendant claims.

In accordance with this invention a measure of residual income is obtained which is not based on adjusted balance-sheet values. Instead a measure of residual income is obtained using a valuation known as "Enterprise Value" or EV to calculate the charge for the cost of capital. Enterprise value is determined by adding market capitalisation and debt, with optional adjustments. The cost of capital charge (EV×i) is deducted from the cash flow or earnings.

This way of calculating the charge for cost of capital can be said to comply with RI theory more accurately than the prior methods.

As an alternative to using the enterprise value, it is also possible to base the residual income calculation simply on the market capitalisation. In this case, the interest rate used is the cost of equity capital only, and the cash flow/earnings used in the calculation are taken after deduction of interest paid.

In either case a number of useful subsidiary metrics can be developed and calculated by special computer programs as discussed below. These metrics can be scored and evaluated in various ways so that the results can be added together by the software programs. The software can then produce a ranking list of the shares being evaluated, identifying those with the highest and lowest scores, representing those that are the most (or least) undervalued (or overvalued). As a result these programs and metrics help to identify overpricings and underpricings in shares.

BRIEF DESCRIPTION OF THE DRAWINGS

The invention will now be described in more detail, by way of example, with reference to the accompanying drawings, in which:

FIG. 8 is a flow chart illustrating the steps for calculating tables of relative valuation in the method of FIG. 1.

DETAILED DESCRIPTION OF THE PREFERRED EMBODIMENTS

Figure 1:
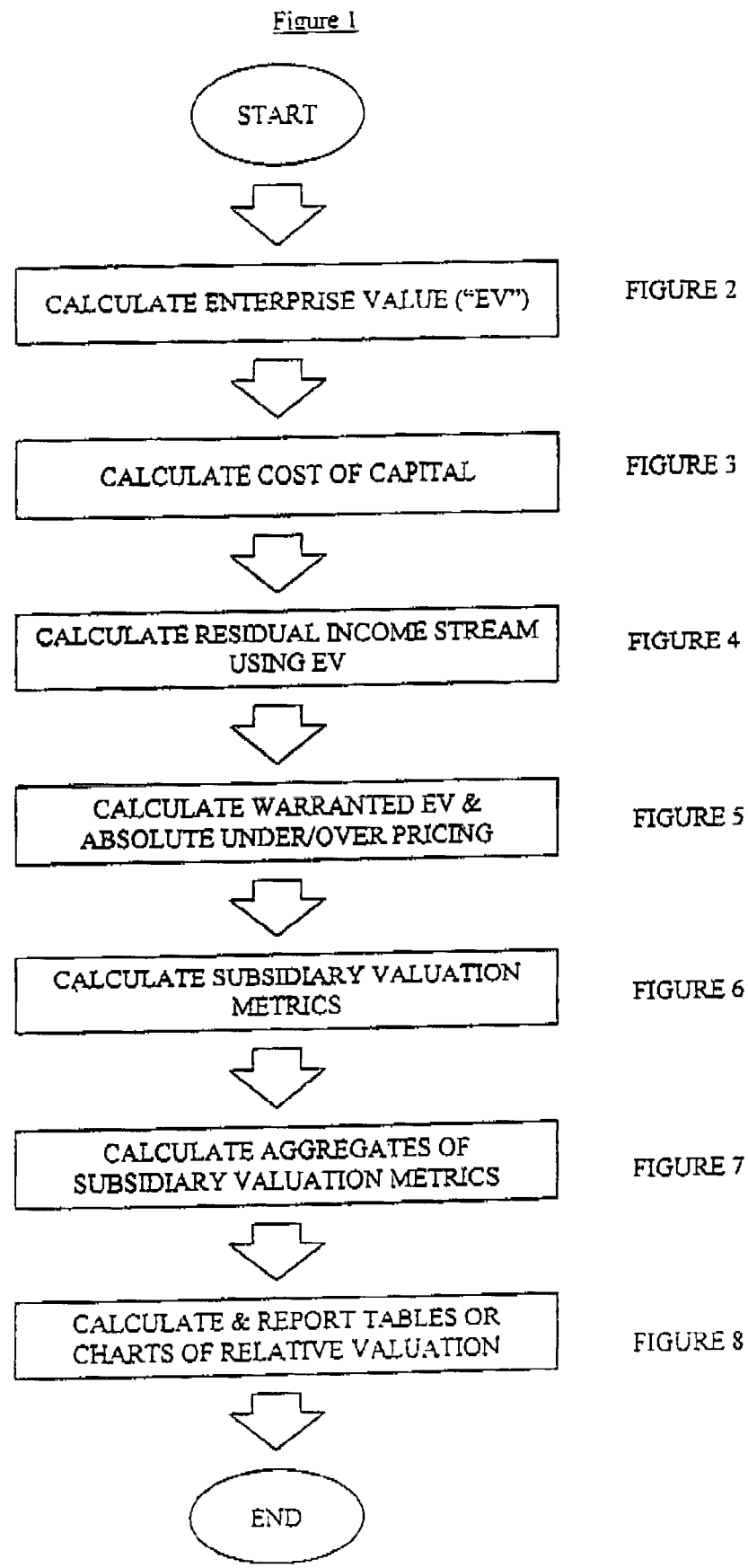
FIG. 1 is a high-level flow chart illustrating the main steps involved in a program embodying the invention in a first aspect and which produces new valuation measures based upon EV+.

It is possible to represent the numbers in a DCF calculation in different ways yet achieve an identical result. We showed above that the PV of $110 received in 1 year, using a 10% cost of capital, is $100. This is another way of saying that the warranted value or present value (PV) of that receipt is $100. But, if it were to cost us only $90 today to secure that receipt in the future, then it would have a net present value (NPV) of $10 ($100-$90). This is the NPV of the investment. It represents the underpricing (or overpricing) of the investment.

Another way of arriving at this underpricing, or NPV, figure is to deduct an interest charge from the $110 receipt in order to arrive at the residual income and then to discount that. In other words, the cost today of $90 would attract an interest charge of $9 (using the same 10% cost of capital). If we were to deduct $9 from the anticipated receipt of $110 we would have a residual income of $101. If we now deduct the original cost of $90 we have a figure of $11 ($101-$90), which represents the surplus of the residual income over the original cost. Discounting this at 10% to give a PV we arrive at $10 ($11/1.1), the underpricing, or NPV, of the cash flow receipt and payment. This is identical to the result produced in the alternative calculation above.

The calculation would be more complex for multiple periods but the same principles apply. These complexities are explained in relation to the determination or $EV_w$ described in detail in the first embodiment below.

So RI techniques can be seen to produce the same results as DCF calculations.

When calculating RI the interest charge is done by reference to the value of the original investment. In our example, $90×10%=$9.

The residual income (RI) model is a variant of the Discounted Cash Flow Model (DCF) that has been commercialized as the way of measuring economic profit, or shareholder value added in a given period. Stern Stewart's EVA is a good example of this as described above, though other DCF-based metrics are available. EVA is defined as a company's earnings, suitably adjusted, less a charge for the capital employed. Capital employed is defined by reference to adjusted balance-sheet values at the beginning of the period in which the RI is being measured. The known EBO (Edwards-Bell-Ohlson) model is another example of balance-sheet-based DCF valuation.

Balance sheets contain valuation problems that impact on RI results. To overcome the valuation problems in balance sheets and intangibles, commercial RI models necessitate complex adjustments.

We have appreciated that corporates and investors might chose to measure residual income differently. Their perspectives on the "investment", or capital employed, are different. For RI calculations corporates might utilise the market values of assets in the balance sheet, as proposed by Stern Stewart with EVA, but investors should substitute the market values of their investment Or the company as a whole, i.e. the values of the shares (or market capitalisation) or enterprise value. However they fail to do this because existing RI measures are based on the balance sheet.

The time period when "capital" is measured is also critical to RI calculations. It can be argued that pure RI mathematics requires the charge to be based on the value of capital invested today, even though commercial RI models use capital at the beginning of each period to generate an intuitive "economic profit". This can seriously affect the capital charge made in computing the RI and therefore the valuation of any share price that may result.

We have appreciated that, since RI techniques generate identical results to DCF calculations, RI can also be used to value shares in a similar way to the use of the DCF share valuation methodology.

We have appreciated that by using alternative valuation methods (employing EV as opposed to the balance-sheet value of capital employed) and timings (using the opening EV number to calculate the interest charged in all subsequent periods), a new RI model can be developed specifically for investors. This model can itself generate a family of valuation metrics, and these can all be produced by software to aid with share valuation and selection. This model is different from existing valuation approaches in 3 significant ways:

It uses EV, not balance-sheet values, as the basis for the charge in the RI calculation. We call this metric "Enterprise Value Added" or "EV+".

It preferably uses the current value of EV as the basis for the capital charge, irrespective of the period for which the RI is being measured. Existing approaches use the balance-sheet values at the beginning of each different period.

It can exploit the data available from investment information providers to produce a large variety of new valuation metrics.

We have also appreciated that the new model can be varied in a number of valuable ways, and that, in order to compute values for all listed companies and allow flexibility in the calculations, it is desirable to use sophisticated software delivery systems. In particular:

the market capitalisation of the company can be substituted for EV. This is described with reference to the second embodiment.

the calculation of EV can be modified to include or exclude optional adjustments.

the valuation of debt can be done in a variety of ways.

the interest rate used to calculate the capital charge can be computed in a variety of ways.

the user may prefer to calculate metrics and values based upon earnings, dividends or cash flows.

the terminal value can be computed in a variety of ways.
the choice of metrics, scoring methods and reporting formats is a choice to be exercised by the user.

Using this EV+ model it is possible to create a series of RI-based share valuation metrics similar to EPS (earnings per share), P/E (price to earnings ratio) and PEG (P/E growth) but incorporating proper RI techniques. These metrics are primarily useful for screening shares within a given sector to highlight those that, prima facie, appear relatively overpriced or underpriced over the medium term.

Strictly, the RI model is based on future cash flows. First Call and I/B/E/S data, and that of other providers, can be exploited to produce these measures and multiple-period residual-income forecasts can be computed using data from providers such as First Call, I/B/E/S and others. Such data tends to be in the form of "consensus" information, namely, the arithmetic mean of the estimates received from individual analysts. The consensus cash flow is therefore a useful tool for input to the calculation of EV-based RI metrics, and using them to screen large ranges of stocks in order to highlight those that may be suitable for purchase or sale.

Certain users may prefer to select only certain analyst estimates for use in the EV+ valuation software.

We have appreciated that it will be desirable to produce sophisticated computer programs in order to generate these metrics and make them available to the investment community. The software should produce valuations for around 20,000 companies at least once per day, but ideally intra-day (every time there is a price or estimate movement). The rankings, scoring and reports will also change every time a valuation is adjusted. We have also appreciated that we will need to enable flexibility in the calculation of the EV+ metrics, particularly in relation to the key variables, such as cash flow.

There are many differing views about the way of calculating the earnings or cash figure that should be used in DCF-based share valuation calculations, and these same arguments apply in the case of EV+ RI metrics. Share analysts may wish to recalculate the model results by substituting their own estimates of key variables such as cash flow. The preferred programs to be described are therefore be tailored to each customer's requirements in this respect and may include the flexibility to use alternative known cash flow and earnings measures and adjustments, such as:

Earnings before interest, tax, depreciation and amortisation (EBITDA)
Earnings before goodwill (EBG)
Cash earnings
Earnings per share (EPS)
Free cash flow (FCF)
Earnings before interest (EBIT)
Funds from operations
Working capital movements
Cash flow per share (CPS)
Tax paid
Capital expenditure
Intangible expenditure, such as Research and Development.

We have appreciated that the model can be used to value long term cash-flow streams, but for practical reasons (published analyst forecasts tend not to exceed a 5-year horizon) the subsidiary metrics currently developed largely focus on the short term, namely the next 5 years.

We have appreciated that the subsidiary short-term valuation metrics we have designed are probably best applied within sectors and generate the most meaningful results when there is an earnings stream to analyse. Thus "dotcom" companies (with no forecast earnings for the next few years) are not as well suited to some of the metrics in this model as would be companies with a reasonably stable and steady forecast performance. We have therefore designed:

flexibility into the model to enable the inclusion of "intangible" and "option" values (which are known techniques) which some consider to give a truer picture of the performance of certain companies. These values are often not recognised in traditional accounting statements. In the standard program, these values need not be included so the use of these values within the program will depend upon the application and the intentions of the customer;

some of the metrics to measure the growth in the rate of EV+ and the present value of EV+ per share. This enables us to produce metrics which may apply to certain technology and internet stock valuations.

We have appreciated that, by focussing on the short term, that is the next 4 or 5 years, these metrics improve on the use of balance-sheet values and some of them avoid the need for terminal-value calculations. However some definitional problems remain with EV, and we have therefore built flexibility into our programs to enable users to adjust the values of EV that they prefer to use in the calculation of our metrics.

We have appreciated that investment information providers, such as First Call and I/B/E/S, are continually expanding their sets of data items and this enables our metrics to be calculated with increasing efficiency. In future, additional information will enable stock valuers to refine their own estimates of the key variable, cash flow. The programs should therefore be designed to enable the incorporation of improved data sets as they are produced.

The EV+ forecasts of today can therefore be improved by:
Standardising the definition of key variables within our model.
Utilising published forecasts for EBITDA or Free Cash Flow in the calculations of EV+.
Improving the consistency of calculation of the key data items collected by information providers.

First Embodiment

Now turning to the first preferred embodiment of the invention, this comprises a method of determining a residual income metric in which the cost of capital is based on the enterprise value. That is to say that in the preferred embodiment the warranted enterprise value is equal to the present value of the stream of all residual income from t periods, that is year 1 to year n, plus the present value of the difference between the terminal value in year n $TV_n$ and the current enterprise value $EV_0$, plus the current enterprise value $EV_0$.

That is, assuming that Free Cash Flow (FCF) is chosen as the measure of earnings, warranted EV is as follows:

$$\text{Warranted } EV = \left[ \sum_{i=1}^{t=n} \frac{FCF_t - (EV_0 \times i)}{(1+i)^t} \right] + \frac{TV_n - EV_0}{(1+i)^n} + EV_0$$

It will be recalled from above that:

$EV = MC + VOD + ADJ$ where MC is market capitalization, VOD is the value of debt, and ADJ represents any adjustments. Thus the value of enterprise value used is determined by adding debt and adjustments, if any, to the current market capitalisation of the investment.

The following is a numerical example of the application of the above formula to give a warranted Enterprise Value, $EV_w$.

If:
- Free cash flow (FCF) in year 1 is 30
- Free cash flow (FCF) in year 2 is 40
- There are only 2 forecasts so "n" is 2
- The terminal value (TV) in year 2 is 110
- The mean cost of capital, "i", is 10%
- The enterprise value (EV) now, $EV_0$, is 100, then:

$$EV_w = \left[\frac{30-(100\times 0.1)}{1.1} + \frac{40-(100\times 0.1)}{1.1^2}\right] + \frac{110-100}{1.1^2} + 100$$

$EV_w = 18.18 + 24.79 + 8.26 + 100$ $EV_w = 151.23$

So the warranted value of the company is 151.23. Since the actual value, $EV_0$, is 100, the company is underpriced by 51.23 (151.23−100).

The above formula is based upon defining EV+ (Enterprise Value Added) as follows:

$EV+ = FCF - (EV \times i)$ where FCF is the free cash flow, EV is a measure of enterprise value based upon market capitalisation and debt, and i is an assumed mean interest rate expressed as a decimal value. The mean interest rate is a mean calculated taking both the cost of equity capital and the cost of debt into account. FCF is therefore taken before interest payments in this embodiment. In accordance with the above equality, EV+ is thus obtained from the free cash flow from which a deduction is made to reflect the cost of capital employed. This deduction is based upon enterprise value multiplied by the cost of capital, "i". Enterprise value is itself dependent upon market capitalisation and debt. As described above, while FCF is preferred, other alternative cash flow and/or earnings measures may be used such as EPS, EBIT, EBITDA, CPS, and so on. Thus, more generally, if E is the earnings (or cash flow) measure employed, and CC is the charge for the cost of capital employed, then:

$EV+ = E - CC$, or, in this case,:

$EV+ = E - (EV \times i)$.

The resultant value of EV+ thus figures in the equation as:

$$\text{Warranted } EV = \left[\sum_{i=1}^{t=n} \frac{EV+_t}{(1+i)^t}\right] + \frac{TV_n - EV_0}{(1+i)^n} + EV_0$$

The term $EV+/(1+i)^t$ is the present value of EV+, and this is evaluated for all time periods t from 1 to n. The values thus obtained are then summed. To this is added the Terminal Value Premium, that is the present value of the difference between the terminal value in year n $TV_n$ and the current enterprise value $EV_0$, $(TV_n - EV_0)/(1+i)^n$. Finally the current value $EV_0$ of the enterprise value is added.

A high-level flow-chart illustrating the main steps of the method embodying the invention is shown in FIG. 1, and the main steps are shown in FIGS. 2 to 8. FIG. 1 sets out the main steps in the method, and refers to the relevant subsequent figures. The main steps are calculating the enterprise value (EV), FIG. 2, calculating the cost of capital, FIG. 3, calculating the residual income stream using the enterprise value, FIG. 4, and then calculating the warranted enterprise value and from that the absolute underpricing or overpricing, FIG. 5. The results obtained in this way can then be used as desired to calculate a variety of subsidiary valuation metrics, see FIG. 6 which gives examples, and the resultant metrics can be calculated as aggregates of subsidiary valuation metrics to give an overall result, FIG. 7. The results thus obtained for a large number of companies or investments can be calculated and tables or charts of relative valuations produced, FIG. 8.

Figure 2:
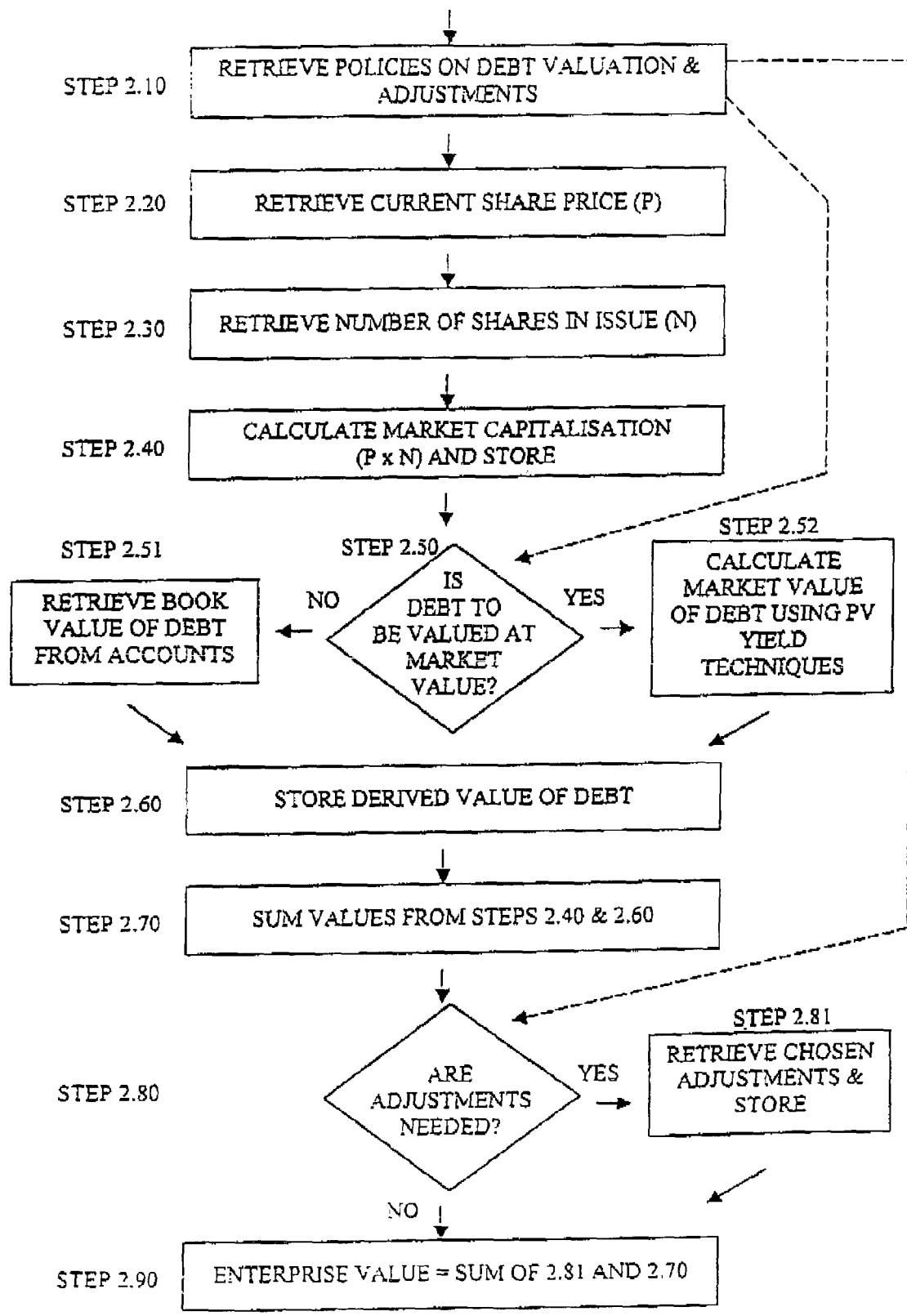
FIG. 2 is a flow chart illustrating the steps for calculating the enterprise value in the method of FIG. 1.

FIG. 2 illustrates a routine which calculates enterprise value (EV). It allows for adjustments to be made if required by the user but this is not essential to the method. The EV figure thus calculated is used in later parts of the method. It first retrieves predefined policies on debt valuation and adjustments, step 2.10. It then retrieves the current share price (P) step 2.20, and the number of shares in issue (N) step 2.30. Both of these values are obtainable from commercial data providers. From these the market capitalisation is calculated as P×N, step 2.40, and stored. A decision is now made in step 2.50 as to whether debt is to be valued at market value, this decision being taken in accordance with the policy retrieved in step 2.10. If it is not, the procedure moves to step 2.51, where the book value of the debts is retrieved from the stored accounts for the company. If it is, the market value of the debt is calculated using standard present value (PV) yield techniques, step 2.52. Other known ways of deriving a market value for debt could be used. In any event, in step 2.60 the thus-derived value for debt is stored.

In step 2.70, the values obtained from steps 2.40 and 2.60, namely the market capitalisation and the debt, are summed together. A determination is made in step 2.80 as to whether any adjustments are needed and if they are the chosen adjustments are retrieved and stored, step 2.81. In either event, the enterprise value (EV) is outputted in step 2.90 by summing the value from step 2.70 with any value from step 2.81.

The policies on debt valuation and EV adjustments will be predetermined to suit any particular application as required.

Figure 3:
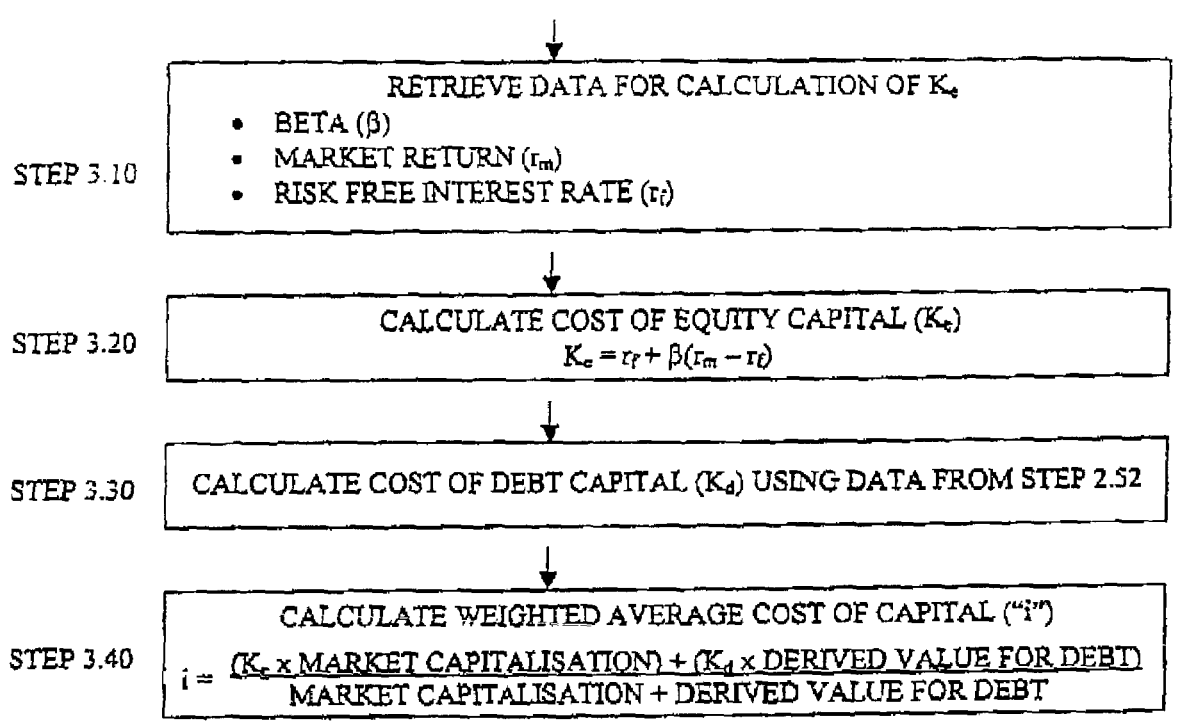
FIG. 3 is a glow chart illustrating the steps for calculating the cost of capital in the method of FIG. 1.

FIG. 3 illustrates a routine which calculates the mean cost of capital, "i". This method is illustrative only since the program may be written to allow the user to employ their preferred method of calculation. The "i" figure thus calculated is used in later parts of the method. In FIG. 3 a weighted average cost of capital is obtained which constitutes the desired mean cost of capital. It is possible simply to choose a desired value for mean cost of capital on an arbitrary basis and use that instead, or to use alternative calculations. In the method illustrated in FIG. 3, in step 3.10 data required for the calculation of the cost of equity capital $K_e$ is first obtained. This comprises three elements, namely a coefficient beta (β), the market return rate ($r_m$), and a risk-free interest rate ($r_f$). The coefficient beta is a published and well-known data item and represents the coefficient of correlation between the returns on a single share, and the returns on the market as a whole. It can, in principle, vary between zero and a value greater than one, and provides a weighting factor to weight the contributions of the market premium return ($r_m - r_f$). In step 3.2, the cost of equity capital is calculated in accordance with the equation:

$K_e = r_f + \beta(r_m - r_f)$.

The next step, step 3.30, is to calculate the cost of debt capital ($K_d$). This step uses data from step 2.52 in FIG. 2. The final step in the calculation of the mean interest rate in FIG. 3 is step 3.40 where the weighted average cost of capital i is calculated. This is calculated in accordance with the equation:

$$i = \frac{(K_e \times \text{Market Capitalisation}) + (K_d \times \text{Derived value for debt})}{\text{Market capitalisation} + \text{Derived value for debt}}$$

There are other known ways of calculating cost of capital which could be used.

Figure 4:
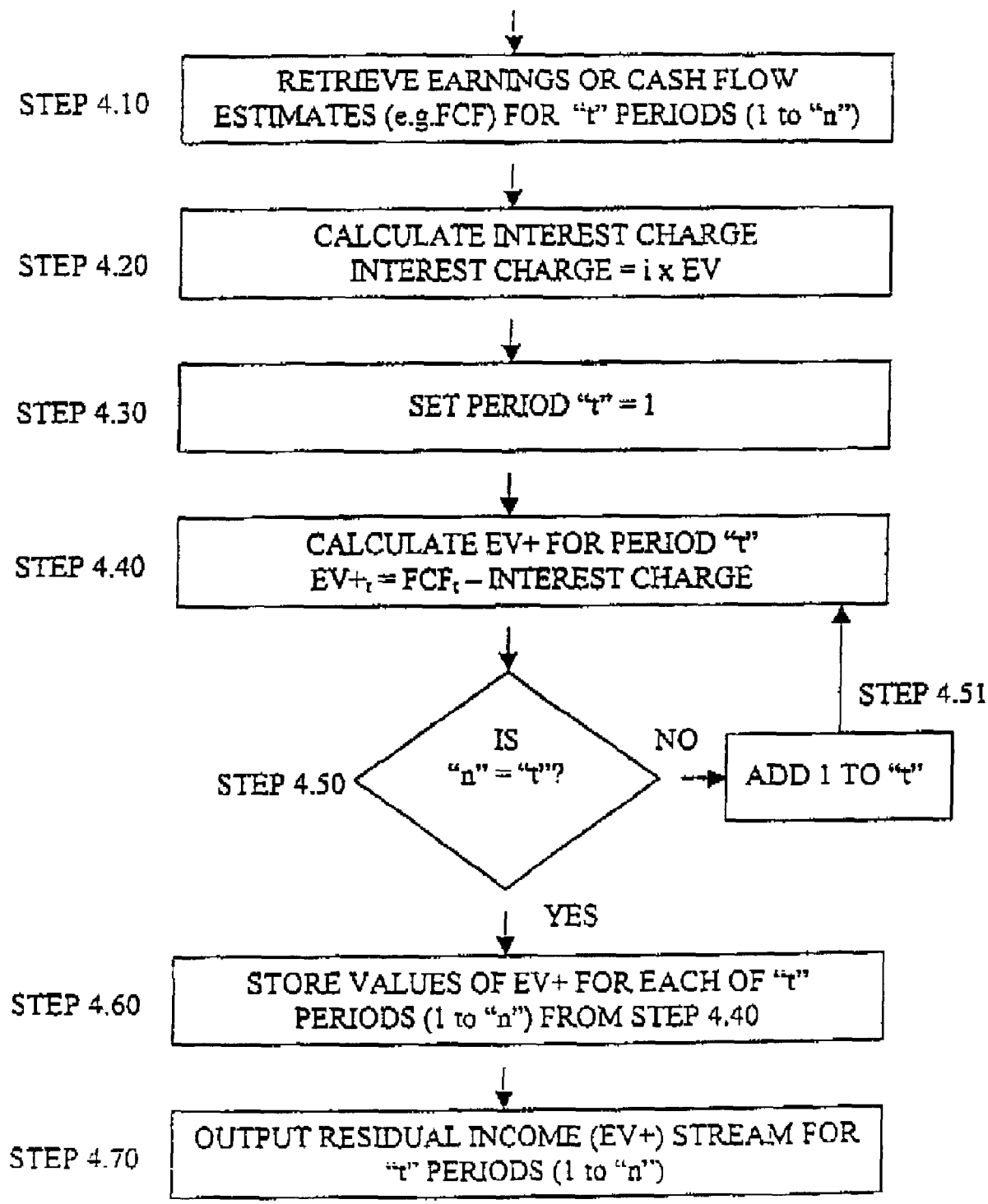
FIG. 4 is a flow chart illustrating the steps for calculating the residual income stream EV+ in the method Of FIG. 1, using EV as an input.

FIG. 4 illustrates a routine which calculates the key new measure EV+. This is the residual income stream. It is noted that an alternative RI metric, using market capitalisation, could also be similarly computed, and this is described below in relation to the second embodiment of the invention. The routine of FIG. 4 is an important feature of the method of the invention. The EV+ values thus calculated are also used in later parts of the method. In the initial step 4.10, the earnings or cash flow estimates, in this case the free cash flow, are retrieved from store for all the time periods t under consideration, namely period 1 to period n. Normally the time periods will be years. In step 4.20 the interest charge is now calculated by multiplying the mean cost of capital calculated in step 3.40 in FIG. 3 by the enterprise value which results from step 2.90 in FIG. 2. The procedure then enters a loop, and initially in step 4.30 the period t is set equal to 1. For this period, in step 4.40, EV+ is calculated as:

$$EV+_t = FCF_t - CC$$

where CC is the charge for the cost of capital employed. After this calculation a determination is made in step 4.50 as to whether all the periods have been processed, that is as to whether t equals n, and if they have not t is incremented by 1 in step 4.51 and the procedure returns to step 4.40 for calculation of EV+ for the next time period. When step 4.50 determines that EV+ has been calculated for all time periods, the values of EV+ are stored in step 4.60, and finally in step 4.70 the residual income stream determined as EV+ for the t periods 1 to n is output.

In step 4.20 in FIG. 4 it is assumed that the interest charge is always calculated by reference to the initial value of EV, that is $EV_0$. Some users may prefer to spread the interest charges that result in a different fashion in order to modify the metrics that are subsequently obtained. This could be achieved using standard DCF and compounding techniques. In addition, some users may prefer to calculate the interest charge by reference to a number of different values for EV, namely $EV_1$ to $EV_n$, which are forecast separately from the beginning of each period. If this is desired, step 4.20 is calculated by reference to a separate EV value for each of periods 1 to n.

As previously mentioned, the example described uses free cash flow as an input. It is possible to use other earnings or cash flow estimates instead of free cash flow.

Figure 5:
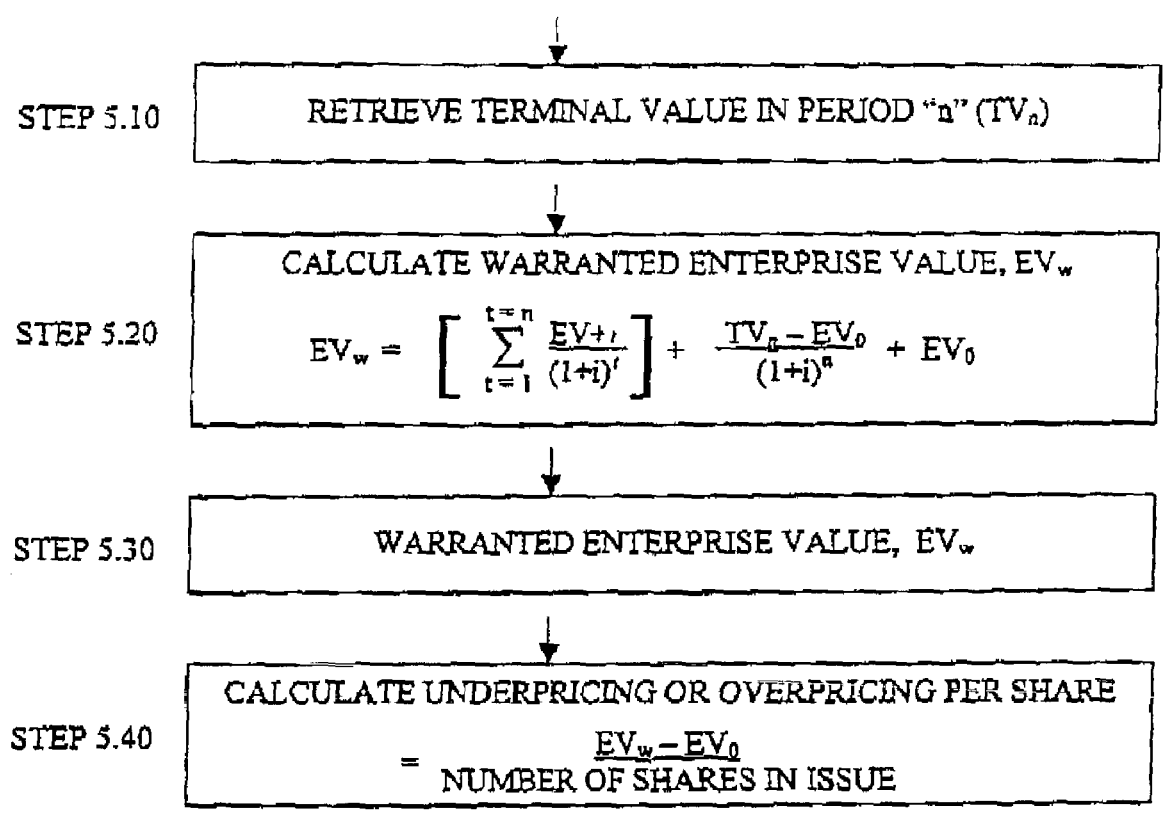
FIG. 5 is a flow chart illustrating the steps for calculating the warranted enterprise value and absolute overpricing or underpricing in the method of FIG. 1.

FIG. 5 illustrates a method for calculating the warranted EV, $EV_W$. This makes use of the above formula, for which a numerical example has already been given. This is also an important feature of the method. The $EV_W$ value thus calculated is used in later parts of the method and, when compared with $EV_0$, highlights the overpricing or underpricing of the company. This can be expressed per share to identify an overpricing or underpricing of the share in both absolute and relative terms. In step 5.10 the terminal value in period n ($TV_n$) is first retrieved. The warranted enterprise value $EV_w$ is then calculated in accordance with the equations given above for warranted EV. The first term represents the summation of the present value of EV+ for the time periods 1 to n. The second term represents the present value of the change in value of the investment from the initial enterprise value to the final terminal value, and the final term represents the present initial enterprise value. This assumes that a terminal value is used, that is to say n is a finite number. It may be possible to set n at infinity, in which case no terminal value needs to be entered, however in most circumstances n will not be set at infinity. The terminal value figure, when used, can be calculated in any desired manner. In step 5.30 the warranted enterprise value thus obtained is stored, and in step 5.40 the underpricing or overpricing per share is determined as ($EV_w - EV_0$) divided by the number of shares in issue.

The underpricing or overpricing may be modified to allow for other values, such as "real options", a known technique for valuing alternative future business decisions and the resulting earnings. Alternatively, this may be incorporated in the method of determining the terminal value $TV_n$.

We have appreciated that, for some applications, it will be desirable that the measure of enterprise value used should differ from that described ($EV_0$), and be based instead on a value of EV which is calculated at the beginning of the period for which the residual income value is to be calculated ($EV_{1,2,3,etc.}$).

A modification of the first preferred method described about will be described in more detail with respect to the second embodiment of the invention. In this modification the RI calculation is changed so the cost of capital charge in step 4.20 is based not on an enterprise value but rather on market capitalisation, $MC_0$. That is to say, the amount of any debt owed by the company is ignored at this point.

The second embodiment of the invention uses the market capitalisation $MC_0$ to calculate a residual income stream based on MC, MC+ and the warranted market capitalisation $MC_w$. This is then used to calculate the under or overpricing of shares. Like EV, it may also be used in a number of different ways as a component in a metric. Examples of such metrics are described next with particular reference to Enterprise Value EV+ explained in the first embodiment. It will be understood however that EV+ and MC+ may be interchanged in the metrics. A more detailed discussion of some metrics in which MC+ is employed follows after the description of the second embodiment.

Dependant and Subsidiary Metrics

The residual income determined by either the preferred or modified method described can be used in a number of different ways, examples of which will now be given.

Examples of the ways in which the residual income determination described above can be used are given in the following metrics:

1. The warranted enterprise value ($EV_w$) can be determined for any given time period (or the warranted market capitalisation $MC_w$ as appropriate).
2. EV+ for any given time period (or MC+ as appropriate).
3. EV+ per share for any given time period (or MC+ as appropriate).
4. The PV of EV+ ("PVEV+") for any given time period (or MC+ as appropriate).
5. The PV of EV+ per share ("PVEV+ per share") for any given time period (or MC+ as appropriate).
6. The sum of a number of EV+ values for a number of time periods (or MC+ as appropriate), whether in absolute terms or on a per-share basis.
7. The sum of a number of PVs of EV+ values for a number of time periods (or MC+ as appropriate) whether in absolute terms or on a per-share basis.

8. The ratio, or if inverted the percentage, of the Current EV per share to (i) EV+ per share or (ii) PVEV+ per share for any given time period, whether for single or multiple periods (or MC+ as appropriate).
9. The ratio, or if inverted the percentage, of the Current EV to EV+ or PVEV+ for any given time period whether for single or multiple periods (or MC+ as appropriate).
10. The ratio of Current Price per share to EV+ per share or PVEV+ per share for any given time period ("P/EV+" or "P/PVEV+"), whether for single or multiple periods (or MC+ as appropriate)
11. The mean of a number of EV+ values for a number of time periods (or MC+ as appropriate), whether in absolute terms or on a per-share basis.
12. The mean of a number of PVs of EV+ values for a number of time periods (or MC+ as appropriate) whether in absolute terms or on a per-share basis.
13. The growth rate in EV+ from one time period to another, whether per-share or in absolute terms and whether measured over one period or many.
14. The growth rate in PV of EV+ from one time period to another, whether per-share or in absolute terms and whether measured over one period or many.
15. The ratio that is produced by dividing either P/EV+ or P/PVEV+ or P/EV+ per share or P/PVEV+ per share by the growth rates in EV+ or PVEV+ or EV+ per share or PVEV+ per share ("PEVG" and variants).
16. Using long term growth (LTG) or other growth rates to compute a share value payback period on PVEV+ per share.
17. Using mean or periodic PVEV+ values (see above) to compute a share value payback period.
18. Using the values produced by the method to compute an EV+ spread, similar to a known metric, EVA spread, but employing EV+ based measures.
19. Using any of the above measures to compute sector, country or global aggregates as shown in flowchart steps 7.10 and 7.20.
20. The impact of a change in estimate can be valued by reference to the difference between the previous and current $EV_w$.
21. Combining the ratios to price of the present values of both the EV+ stream and the terminal value premium, to determine the overall relative over/under pricing of a company in relation to its peers.
22. Calculating how many years it takes for an initially negative EV+ to become positive, to determine the 'EV+ breakeven point'.
23. The mean of each of the metrics 8, 9, and 10 above, where the values are determined for multiple time periods.

EV+ may be defined as the mispricing in any one year up to period 'n'. When compared to share price, the resulting P/EV+ ratio, metric 10, (or alternatively EV+/P), is a powerful equivalent of a P/E ratio. The present value of EV+ compared to share price (P/PVEV+), may also be used.

P/EV+ gives a percentage misvaluation in any of 'n' years and also shows the total percentage misvaluation over the whole of 'n' years. The real value of these percentages is when the percentages of a company are compared to those of the company's peers to show relative mispricing. This enables sector-wide effects to be measured separately from company-specific misvaluations. For example, while undervaluing of an entire sector would be indicated by positive P/EV+ ratios for all or most of the companies in that sector, the relative underpricing of a particular company in relation to its peers can be deduced from the comparison of the respective P/EV+ ratios for the different companies and by comparison with the sector or peer group average or aggregate. If Company A's ratio is larger than than the peer group average by 5% say, then it can be deduced that Company A is perhaps undervalued in relation to its peers by 5%.

In the same way that Price-Earnings Growth (PEG) is a valuable variable in Earnings Per Share (EPS), it is useful to produce a ratio for EV+ incorporating the growth rate in EV+ from one year to another, EV+ PEG, or P/EV+G, metric 15. This helps to identify those companies that are significantly mispriced compared to their peers and highlights those that will become increasingly so if they achieve their forecast earnings growth rates.

The evaluations provided by P/EV+, or the P/PVEV+ focus only on the short-term relative EV+ streams of a company and its comparator peer group. It ignores the relative terminal value premium, which is longer term in nature. Metric 21, combines the short-term P/EV+ stream with the terminal value premia of all peers to provide an overall relative measure of misvaluation of a company in relation to its peers.

The EV+ breakeven point, metric 22, is particularly useful for technology companies in which a great deal of potential shareholder interest lies in the company's ability to generate long term growth. The EV+ figure of technology companies for the first few years may well be negative, indicating an overpricing of the shares. However, reference to the EV+ breakeven point of different technology companies provides a useful comparison of their relative strength.

Another metric that allows evaluation of different companies is the growth rate implied within the Terminal Value (TV) calculation, as growth is implied in the majority of these calculations. Those companies that require a higher growth rate in order to justify their current price may be deemed to be relatively overvalued or more risky than their peers.

A detailed example of the use of some of these metrics will now be explained.

Table 1 below shows a detailed example of how a business, Company A, can be valued using EV+ methods. The process is similar to that used in residual income calculations. This particular example uses an analyst's terminal value of the company, $0.9 m, representing the value of the free cash flows from Year 4 onwards. The current market value of the company's equity is $0.5 m, and the debt is $0.2 m, so the EV is $0.7 m ($0.5 m plus $0.2 m). The company's cost of capital has been calculated to be 11 percent. It has 100,000 shares in issue, so the current price per share is $5.

In this example, the free cash flow in the first three years is $140 000, $150 000 and $165 000 respectively, as shown in the first row of the table. There are three forecasts so n=3.

The second row of the table shows the capital charge value of (EV×i), and the third the residual income stream (EV+) which is the result of the subtraction between the free cash flow and the capital charge.

The fourth row shows the discount factor or $1/(1+i)^n$ for each of the three years, and the fifth row shows the EV+ stream value or present value of the EV+. This is the value given by the first term in the equation for the warranted EV+ value calculated for each of the respective three years. The fourth column of this row shows the total of the summation as $179 700.

The sixth, seventh and eighth rows of the table show the figures for the calculation of the second term in the warranted EV+ equation. The terminal value profit $(TV_n - EV)$ is calculated to be $200 000. This figure is then discounted by a factor 0.713 to reflect the real value over three years. The present value of the terminal profit is therefore $146 200.

Summing these two values gives the total under or over pricing of Company A as $325 900. If we add this to the current EV of $700 000 we get the warranted Enterprise value or Estimated true Enterprise value as $1 025 900.

If the company's debts of $200 000 are then deducted, the estimated true value of the Equity capital is $825 900 which when divided by the number of shares gives a true share price of $8.26. The company therefore appears to be undervalued by $3.26.

The next step is to perform a relative evaluation of Company A against its peers. This figures for this are shown in Table 2. The first five rows of Table 2 show the calculation of the total present value of EV+, and the present values of EV+ for each of the years in the EV+ stream.

The sixth row shows the value of PVEV+ per share, metric 5, and the seventh, the Price to PVEV+ ratio, P/PVEV+, metric 10. This can be seen to be the share price of $5 divided by the EV+ per share value. The eighth row of the table shows the mean P/PVEV+ for the peer group or sector in each of the years. The percentage difference between the P/PVEV+ ratio for Company A and the P/PVEV+ for the peer group is shown in the last row for each year. The percentage differences are 17.3% for the first year, 18.1% for the second and 2.6% for the third.

The initial valuation of Company A showed that it appeared undervalued as its current price of $5 is less than its target price of $8.26. The total undervaluation consists of the EV+ stream and the PV of the terminal value profit. It results in positive values for the P/EV+ ratio. If the EV+ stream were negative the share would be overpriced and the P/PVEV+ ratio would also be negative.

A similar analysis of peer group companies shows that they too are undervalued, as shown by the positive P/PVEV+ ratios in row 8 of table 2. Therefore it is possible that the entire sector has been downrated, perhaps for general economic reasons, and this needs to be reflected in the valuation of Company A. The way to incorporate this downrating is to measure the relative ratios of P/PVEV+. The comparisons in table 2 show that Company A's ratios are between 2.6% and 18.1% higher than the peer group. The mean of the percentages for company A is 12.6%, which indicates that all things being equal, Company A is undervalued by around this figure. Its true share price in the current market should perhaps be around $5.63 ($5×1.126). This is a relatively short-term valuation as it focuses on EV+ for only three years only. As the market for this sector improves this target price may rise towards the initial valuation of $8.26.

There is yet another factor which could be considered before finalising the target price. The valuation above focuses on the short term relative EV+ streams of Company A and its comparator peer group, and as mentioned earlier ignores the relative terminal value premia, which are longer term in nature. It is possible that the terminal value profits of the peer group when compared with the share price, may be significantly different from Company A. If so, this difference should also be taken into account.

By combining the ratios to price of both the EV+ stream and the terminal value profits, it is possible to identify the overall relative over/underpricing of a company in relation to its peers. Similar calculations can be performed for the comparison of entire sectors.

As mentioned earlier, incorporating the growth rate in EV+ from one year to another helps to identify those companies that are significantly mispriced compared to their peers. Table 3 illustrates the calculation.

The first row of the table shows the values calculated before for the EV+ stream, and the second shows the relative growth in the EV+ stream from one year to the next. For example, the growth for year 2 is given by 59.3/56.8 expressed as a percentage, while that for the third year is given by 63.6/59.3 expressed as a percentage.

The third row shows the P/PVEV+ ratio for each of the three years (shown in table 2). This figure is then divided by the percentage value of growth (row 2) to give P/PVEV+ per growth rate, metric 15.

This ratio is useful for comparative share valuations. As with normal PEG ratios, the higher the growth rate the lower the ratio. Faced with a choice between two companies that have similar positive P/EV+ ratios, investors should prefer the one that has a lower ratio of P/EV+ G.

We have appreciated that the EV+ metrics produce different results depending upon the variables used in the calculation. We have appreciated that this enables sophisticated users (and/or sophisticated delivery software) to produce alternative values using a variety of inputs. We have appreciated that the dispersion of these alternative values can be plotted and that statistical measures of the dispersion or these values can be produced. We have appreciated that low statistical measures of dispersion give greater confidence in the range of values that result and help to measure the riskiness of the investment. We have appreciated that this process could be automated within the software and that a family of valuation confidence and risk measures can be generated as a result.

We have further appreciated that the metrics can be used to evaluate the market sentiment in relation to a particular company. By using EV+ metrics to compare a company with its peers (or a sector or index), it will be seen to be relatively overvalued or undervalued by a given percentage. By then comparing this percentage with previous values, a trend can be established, and it can be demonstrated whether the company's relative value is increasing or decreasing, demonstrating whether market sentiment is moving in its favour or against it.

Figure 6:
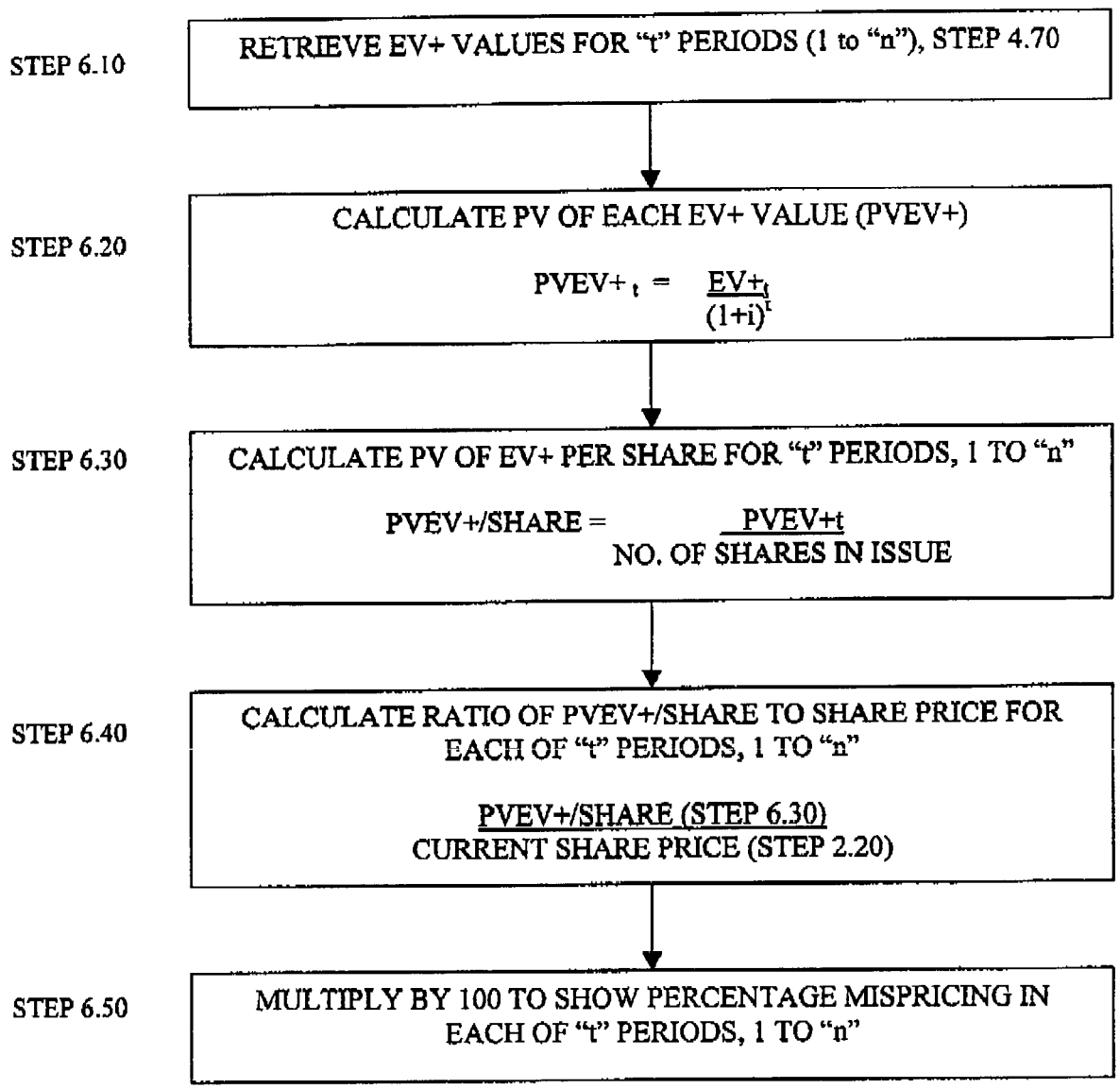
FIG. 6 is a flow chart illustrating the steps for calculating examples of the subsidiary valuation metrics in the method of FIG. 1.

FIG. 6 illustrates the calculation of some of the many subsidiary metrics that can be computed using EV+. These are useful because they enable conclusions to be drawn about the share price. In particular many of them focus on near-term EV+ values and avoid the need for a terminal value to be calculated. In the example shown in FIG. 6, in step 6.10 the EV+ values in relation to a company or investment are first retrieved, for the t periods 1 to n. These were stored in step 4.70 described above. In step 6.20 the present value of each of these EV+ values is calculated as follows:

$$PVEV+_n = EV+_n/(1+i)^n$$

From these values the present value of EV+ per share is calculated for the t periods 1 to n, by dividing the resultant of step 6.20 by the number of shares in issue. Then in step 6.40 the ratio of the resultant PVEV+ per share to the share price is calculated for each of the t periods 1 to n, by dividing the resultant of step 6.30 by the current share price which was determined in step 2.20 in FIG. 2. Finally in step 6.50, the resultant can be multiplied by 100 to show a percentage mispricing in each of the t periods 1 to n. Thus, referring to the 23 metrics enumerated above, step 6.20 generates metric 4, step 6.30 generates metric 5 and step 6.40 generates metric 10. The results thus obtained can be inverted if desired. The results obtained in step 6.50 may also be added together, or a mean figure derived for the t periods 1 to n. Many other subsidiary valuation metrics can be developed using EV+. In particular, the growth ratio of PVEV+ can be calculated and compared to the share price for example, metric 15.

Figure 7:
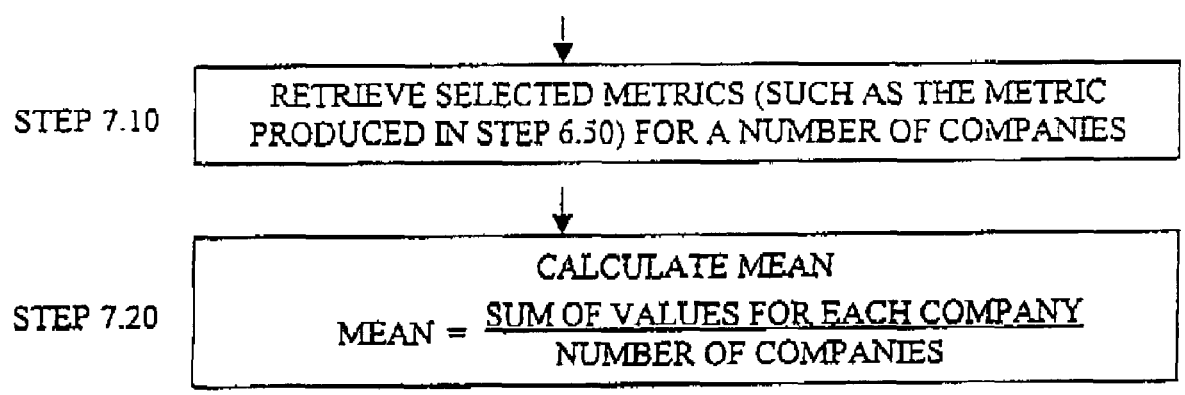
FIG. 7 is a flow chart illustrating the steps for calculating the aggregates of subsidiary valuation metrics in the method of FIG. 1.

FIG. 7 illustrates the calculation of aggregate metrics for a group of companies. These are useful for comparing the price performance of one company with a group of its peers, indicating whether it is relatively overpriced or underpriced. FIG. 7 comprises just two steps, namely step 7.10 in which the selected metrics for a number of companies are retrieved, these for example being the metric produced in step 6.50 in FIG. 6, and the mean calculated as the sum of the values for each company divided by the number of companies, in step 7.20. The use of aggregate metrics enables the comparison of one company with a group of companies, either within the same sector, country, or stock market. Aggregate metrics can be calculated using arithmetic means or using more sophisticated techniques. For example, the mean can be weighted by the market capitalisations of the companies involved. The simple calculation shown in FIG. 7 is, therefore, only one straightforward example. It demonstrates how EV+ metrics can be converted into aggregates, and in any particular application the choice of EV+ metrics for conversion to aggregates will be selected as desired.

FIG. 8 illustrates the use of company and aggregate metrics in a table, enabling the results to be reported to users of the program. In step 8.10 the selected subsidiary valuation metrics, such as the metric produced in step 6.50 in FIG. 6, are retrieved for a number of companies. In step 8.20 the aggregate metrics such as that produced in step 7.20 in FIG. 7 are likewise retrieved, and in step 8.30 the thus retrieved values are sorted and listed in a table or chart. There are many ways of comparing the results of different companies using the combined or aggregated results of EV+ metrics of the type enumerated as metric 1 to metric 23 above.

In a proposed system, for example, short and long term metrics are employed and combined to give a total metric. The short term metric is calculated from the residual cash income that is forecast to be earned after deducting the capital charge for $EV_0$, the current Enterprise Value. This residual income is divided by the number of shares in issue and then compared to share price to provide a short term metric (metric 10).

The EV+ relative misvaluation data provided by this short term metric can be usefully combined on display with a rebased historic price chart. This would give a user of the proposed system, an immediate insight into the way that prices have moved and shows whether based on earnings forecasts, the current price is too high or too low.

The long term misvaluation metric is represented by the premium of the terminal value above the current Enterprise value. This premium is discounted to a current value, divided by the number of shares in issue and the compared to share price. The values for each of the companies is preferably shown to a user in the form of a table or graph.

An additional, and worthwhile, long term metric is to compute the growth in the terminal value that is required to bring a company's valuation in line with the peer group mean. This enables comparison of different companies and indicates the riskiness of those that need significantly higher levels of growth in order to justify their price.

The combination of the short and long term metrics provide a more complete misvaluation picture. The results may usefully be compared to the peer group average in order to separate sector and non-sector effects.

Thus the preferred embodiments described above and illustrated in FIGS. 1 to 8 provide improved or at least alternative residual income valuations in that they use a measure of enterprise value ($EV_0$), defined as market capitalisation plus debt (plus adjustments, if any) as the basis for calculating the capital charge, or alternatively they use the market capitalisation alone.

Modification—Second Embodiment

As mentioned earlier, the second embodiment of the invention comprises a modified RI calculation, so that the cost of capital change in step 4.20 is based not on an enterprise value, but on the market capitalisation.

In doing this modification it is necessary to use the cost of equity capital (Ke), step 3.20, as the value for "i'", rather than a value for mean cost of capital taking both equity and debt into account. It is also necessary to use as the free cash flow figure in step 4.10, and in the calculation of $TV_n$, step 5.10, a figure for earnings after interest or FCF'. That is, FCF' is derived from FCF by deducting a charge for the interest payable on debt capital.

The formula for calculating the warranted market capitalisation, $MC_w$, is thus:

$$\text{Warranted } MC_W = \left[ \sum_{i=1}^{t=n} \frac{FCF'_t - (MC_0 \times i')}{(1+i')^t} \right] + \frac{TV'_n - MC_0}{(1+i')^n} + MC_0$$

This thus comprises a method of determining a residual income metric in which the cost of capital is based on the market capitalisation. That is to say that in the second embodiment the warranted market capitalisation is equal to the present value of the stream of all residual income from t periods, that is year 1 to year n, using earnings after interest, plus the present value of the difference between the terminal value of the market capitalisation in year n $TV_n$' and the current market capitalisation $MC_0$, plus the current market capitalisation $MC_0$.

If in the above formula Market Capitalisation Plus MC+ is defined as follows:

$$MC+ = FCF' - (MC \times i')$$

where FCF' is the free cash flow after debt interest, MC is market capitalisation, and i' is the assumed equity interest rate after debt payments expressed as a decimal value. In accordance with the above equality, MC+ is obtained from the free cash flow from which a deduction is made to reflect the market capitalisation. As described above, while FCF' is preferred, other alternative cash flow and/or earnings measures may be used. Thus, more generally, if E' is the earnings (or cash flow) measure employed after debt interest, and CC' is the charge for the cost of equity capital employed, then:

$$MC+ = E' - CC',$$

or, in this case,:

$$MC+ = E' - (MC \times i')$$

The procedure illustrated in FIGS. 2 to 5 is followed with appropriate alterations. In particular, market capitalisation MC is substituted for EV in steps 4.10 to 4.70. Also, instead of the calculation shown in FIG. 3, the interest rate i' is set simply to the cost of equity capital, $K_e$. Finally, the earnings or cash flow data used in step 4.10 is first adjusted so as to be the result after interest, that is the interest payable on the debt capital is deducted from the forecast or earnings cash stream.

Thus this modified system uses market capitalisation alone as the basis for calculating the capital charge. In calculating the present value for future years the measure or market capitalisation can be based on $MC_0$, as described, or alternatively can be based on a value for MC which is calculated at the beginning of the period for which the residual income is to be calculated ($MC_{1,2,3,etc}$).

Figure 9:
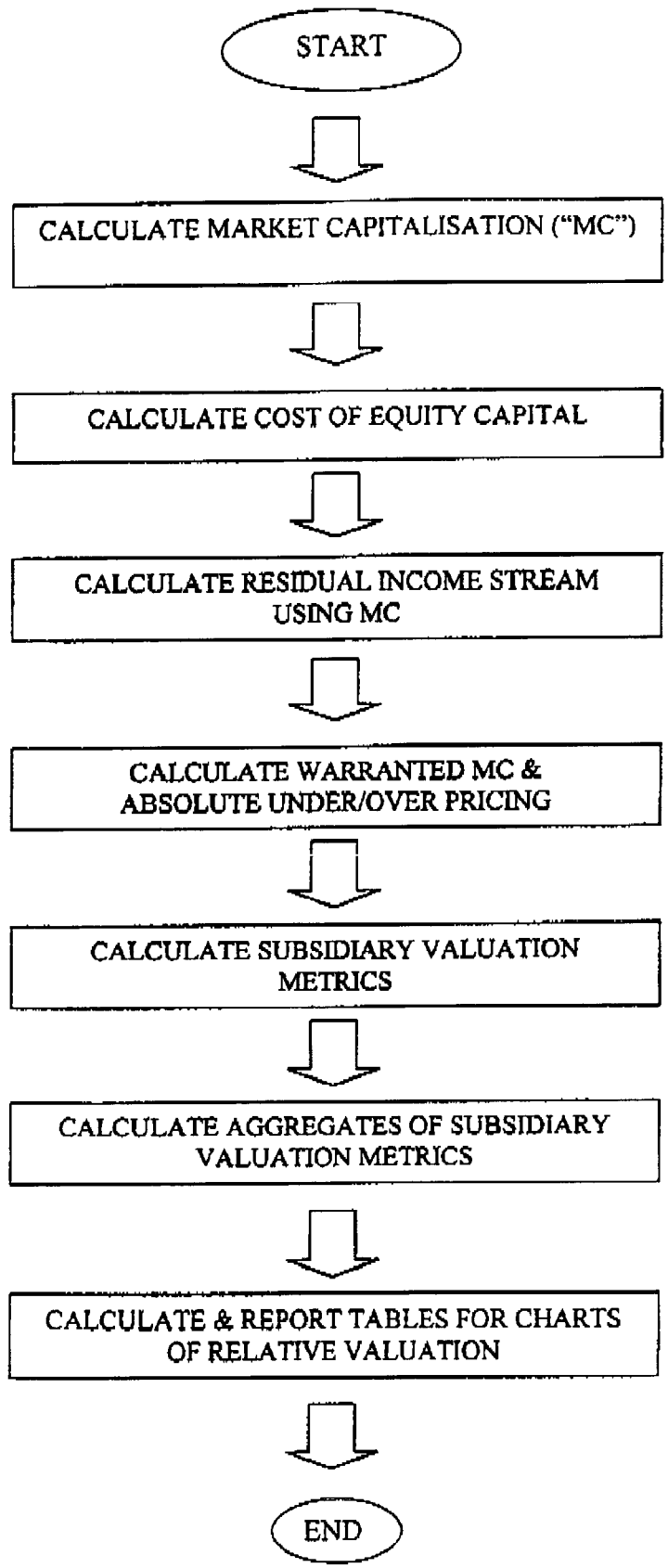
FIG. 9 is a high-level flow chart illustrating the main steps involved in a program embodying the invention in a second aspect which produces new valuation measures based on MC+.
Figure 14:
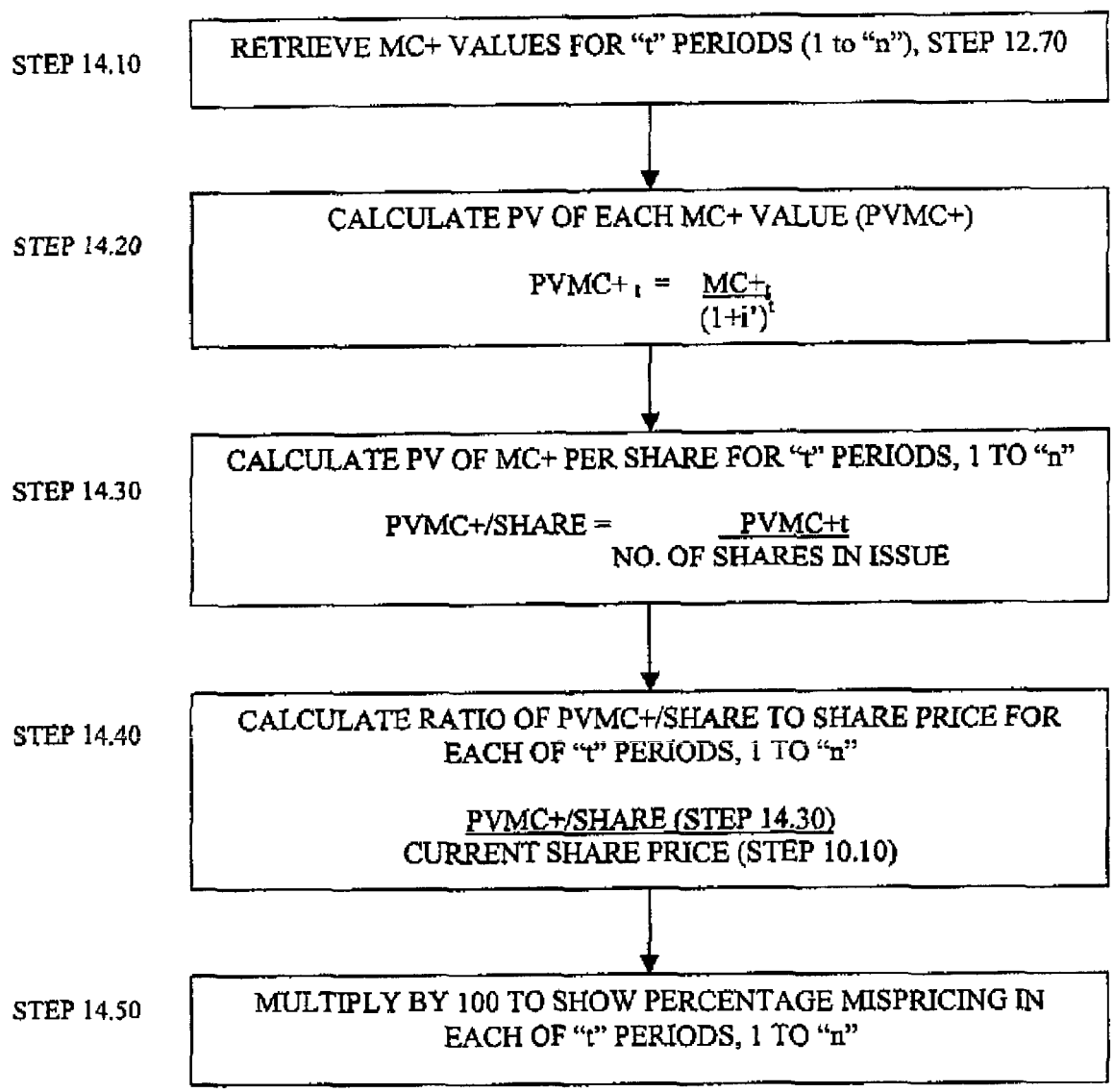
FIG. 14 is a flowchart illustrating a routine for calculating examples of subsidiary valuation metrics based on market capitalisation values, in the method of FIG. 9.
Figure 15:
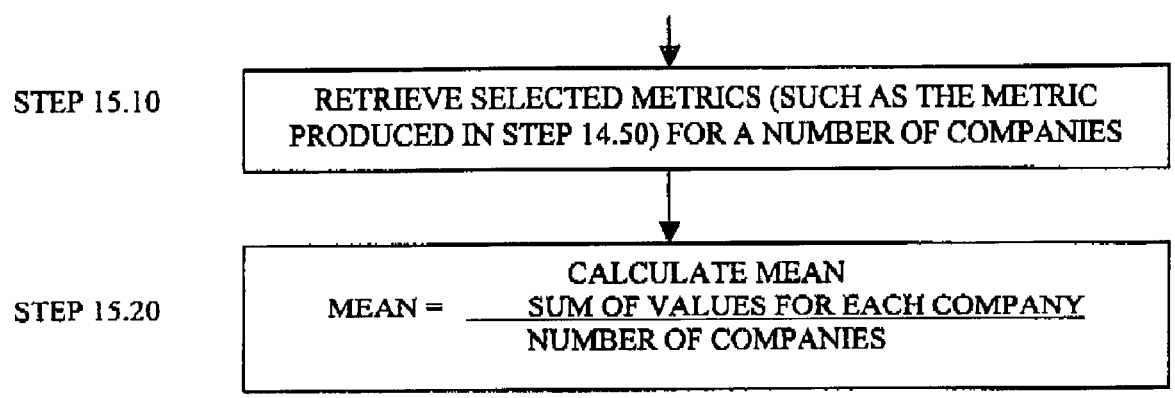
FIG. 15 is a flow chart illustrating a routine for calculating the aggregates of subsidiary valuation metrics like that shown in FIG. 14, in the method of FIG. 9.
Figure 16:
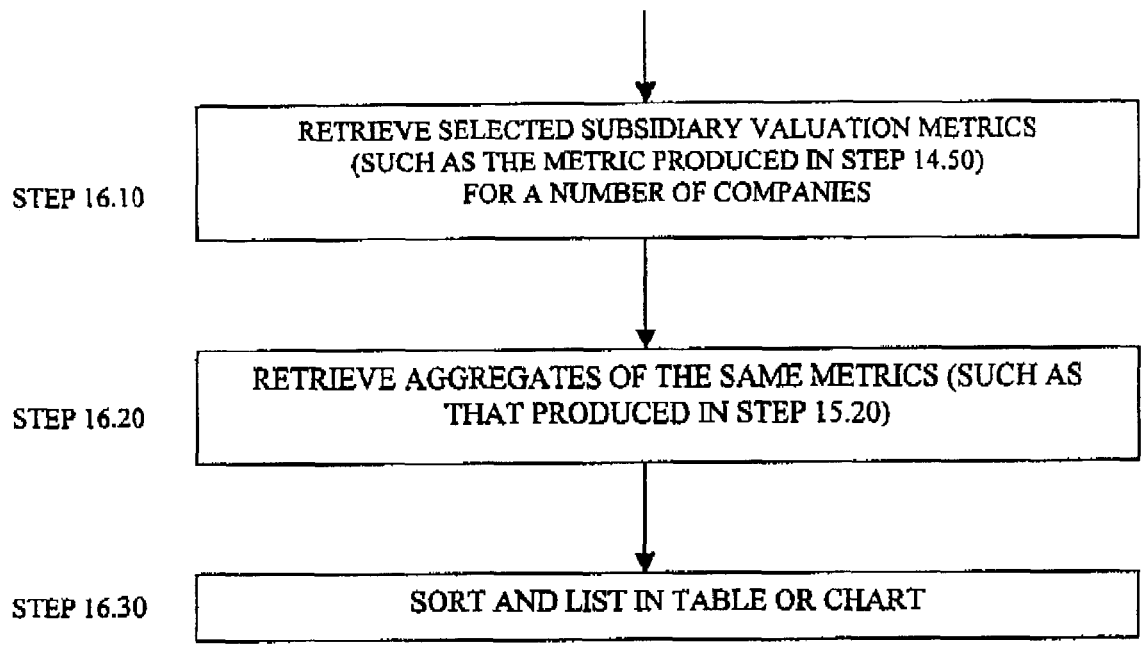
FIG. 16 is a flow chart illustrating the steps for calculating tables of relative valuation in the method of FIG. 9.

FIG. 9 is a high level flow chart illustrating the main steps in the method according to the second embodiment of the invention. FIG. 9 refers to relevant subsequent FIGS. 10 to 16 which illustrate the steps in more detail. The main steps are similar to those for the first embodiment but involve modifications necessary for the calculation of MC, and the subsequent valuation process. The main steps are calculating the market capitalisation, FIG. 10; calculating the cost of equity capital, FIG. 11; calculating the residual income stream using the market capitalisation, FIG. 12; calculating the warranted market capitalisation and using that to calculate the absolute overpricing and underpricing FIG. 13. As before, these results can then be used as desired to calculate a variety of subsidiary valuation metrics. Examples of these are shown in FIGS. 14 to 16.

Figure 10:
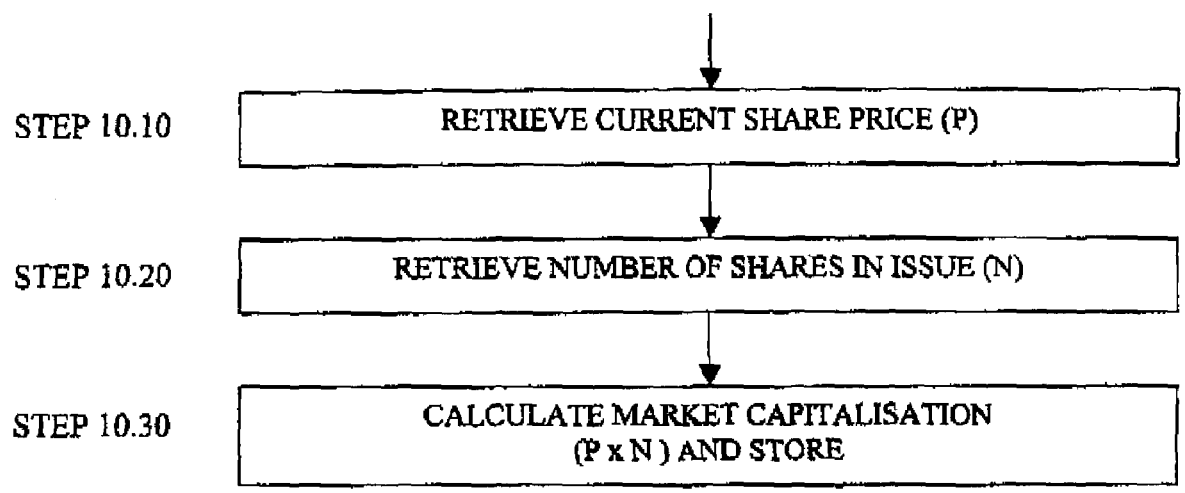
FIG. 10 is a flow chart illustrating the steps for calculating a market capitalisation value for use in the method of FIG. 9.
Figure 11:
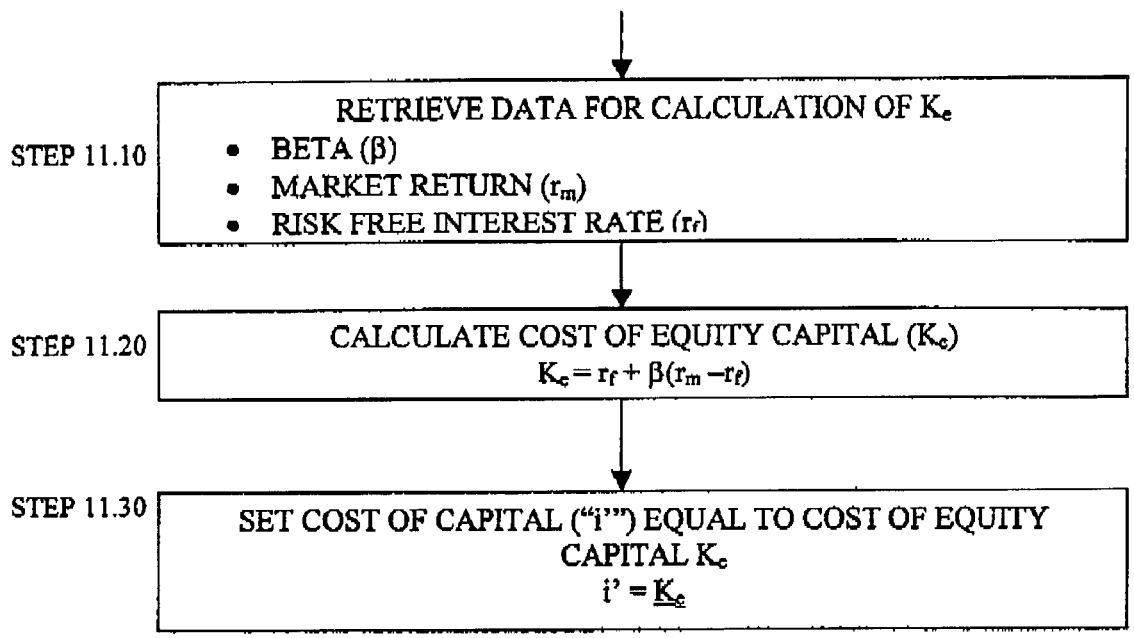
FIG. 11 is a flow chart illustrating the steps for calculating the cost of equity capital in the method of FIG. 9.

FIGS. 10 to 13 show the procedure for calculating the warranted market capitalisation $MC_w$, in accordance with the second embodiment of the invention. It will be appreciated that the procedure is similar to that shown in FIGS. 2 to 5 only with appropriate alterations. In particular, market capitalisation MC is substituted for EV in steps 4.10 to 4.70 to produce steps 12.10 to 12.80. Also instead of the calculation shown in FIG. 3, the interest rate i is simply set to the cost of the equity capital, $K_e$. This is illustrated in FIG. 11. Also, the earnings or cash flow data used in step 12.10, differs from that used in Step 4.10 in that it is adjusted so as to be the result after interest, that is the interest payable on the debt from the forecast or earnings cash stream.

FIG. 10 illustrates a routine which calculates a value for the market capitalization $MC_0$.

As explained earlier with reference to FIG. 2, the routine first retrieves the current share price (P), step 10.10, and the number of shares in issue (N), step 10.20 and calculates, step 10.30, a figure for the market capitalisation. This is also stored in Step 10.30 and is made available for later routines.

FIG. 11 illustrates a routine for calculating the cost of equity capital used in the calculation of the second embodiment. The interest rate value to be used will be set equal to the cost of equity capital. The routine is similar to that illustrated in FIG. 3. In step 11.10, the data required for the calculation is obtained. The data comprises three elements, namely the coefficient beta ($\beta$), the market return rate ($r_m$) and the risk-free interest rate ($r_f$). In step 11.20, the cost of equity capital $K_e$ is calculated according to the equation $K_e = r_f + \beta(r_m - r_f)$. In step 11.30, the value of the interest rate i' is simply set equal to the cost of equity capital $K_e$.

Figure 12:
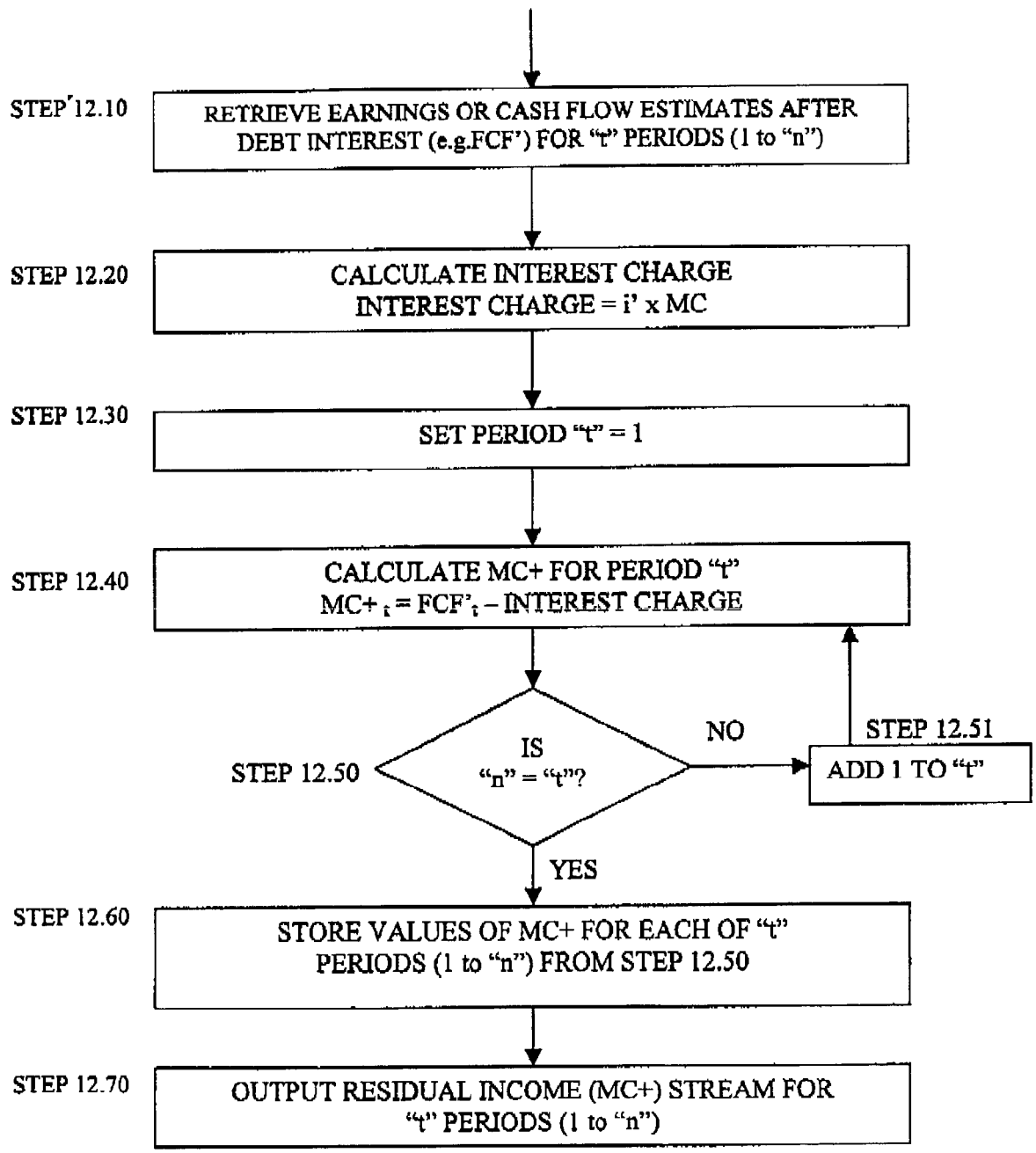
FIG. 12 is a flow chart illustrating the steps for calculating the residual income stream MC+ in the method of FIG. 9.

FIG. 12 illustrates a routine which calculates the value for Market Capitalisation Added, MC+. In step 12.10, earnings or cash flow estimates after interest, in this case free cash flow, FCF', are retrieved from the store for all of the time periods under consideration, namely period 1 to period n.

In step 12.20, the interest charge on the Market Capital is then calculated by multiplying the interest rate i' by MC.

The routine then enters a loop in which the period t is initially set to be equal to 1, in step 12.30, after which it is incremented by 1 for each cycle of the loop until t=n, where n is the number of periods. For each period t, the Market Capitalisation Added value is calculated in step 12.40, according to the equation:

$$MC+_t = FCF'_t - (i' \times MC)$$

After the calculation for a period t, a determination is made in step 12.50 as to whether all periods have been processed, that is whether t=n. If they have not, t is incremented by 1 in step 12.51 and the procedure returns to step 12.40 and calculates the value of MC+ for the next time period t+1.

When step 12.50 determines that MC+ has been calculated for all time periods, the value of MC+ are stored in step 12.60. Finally in step 12.70 the residual income stream based on MC+ for the periods t=1 to t=n is output.

As described earlier with reference to FIG. 4, the calculation of MC+ can be varied by using standard techniques to calculate spread interest changes, or by using a value of MC that is calculated separately for each period. Also, instead of free cash flow FCF, other earnings or cash flow estimates could also be used.

Figure 13:
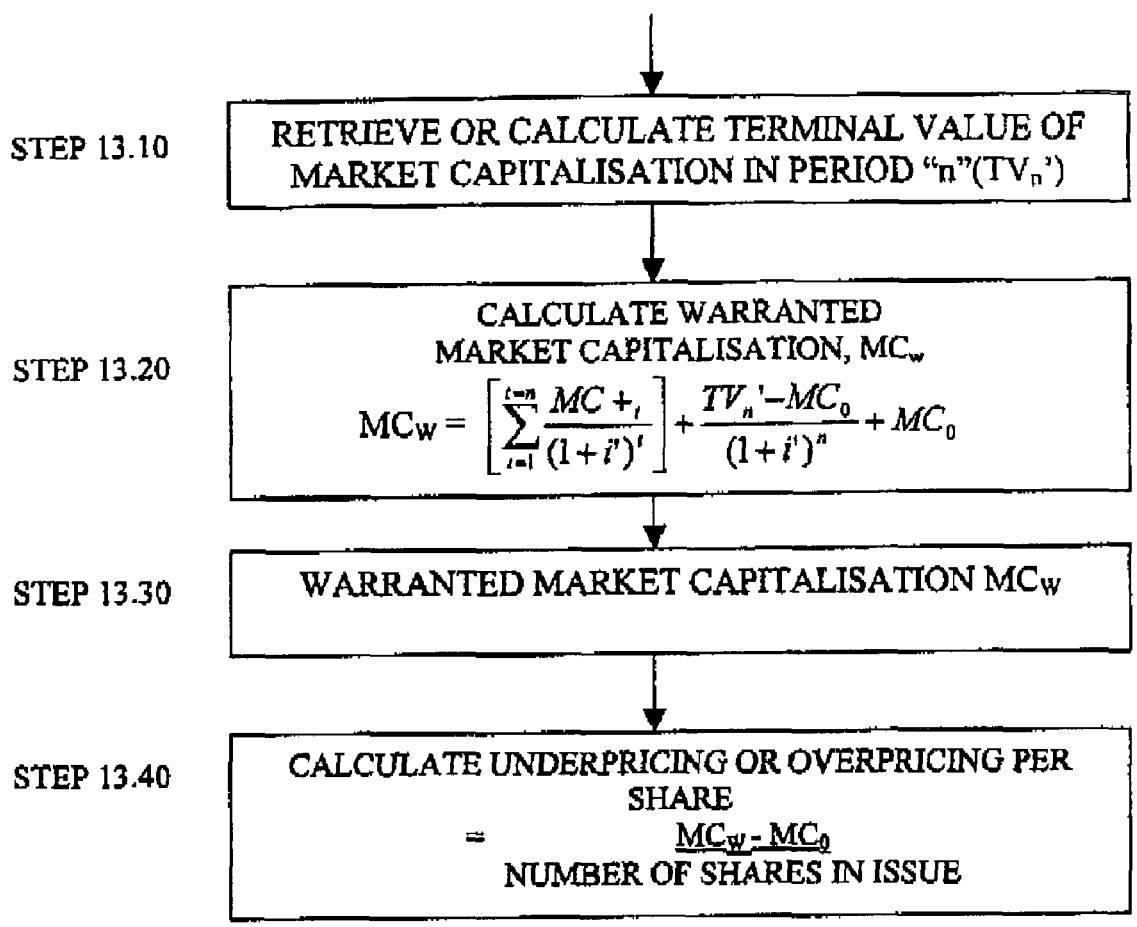
FIG. 13 is a flow chart illustrating the steps for calculating the warranted market capitalisation $MC_w$ and absolute overpricing or underpricing in the method of FIG. 9.

FIG. 13 illustrates a routine for calculating the warranted MC, $MC_w$. The calculation is the same as that illustrated in FIG. 5, only MC+ is substituted for EV+, and $MC_0$ is substituted for $EC_0$. In step 13.10, the terminal value of the market capitalisation for the final period n ($TV_n'$) is retrieved or calculated using known techniques. In step 13.20, the warranted Market Capitalisation is calculated according to the equation:

$$\text{Warranted } MC_W = \left[ \sum_{t=1}^{t=n} \frac{FCF'_t - (MC_0 \times i')}{(1+i')^t} \right] + \frac{TV'_n - MC_0}{(1+i')^n} + MC_0$$

In step 13.30, the value $MC_w$ calculated in step 13.20 is stored. This value is then used in step 13.40, with the value $MC_0$ to calculate the underpricing or overpricing of shares.

FIGS. 14 to 16 show subsidiary metrics corresponding to those shown in FIGS. 6 to 8, only they are based on Market Capitalisation rather than enterprise value.

In FIG. 14 a routine is illustrated which shows a calculation for the percentage mispricing of share price. In step 14.10 the MC+ values in relation to a company or investment are first retrieved for each of the t periods 1 to n. These were stored in step 12.70. Next in step 14.20, the present value of each of the MCT values is calculated according to the equation:

$$PVMC+_t = MC+_t/(1+i')^t$$

From the present values of each of the MC+ values, the present value of MC+ per share is calculated for the t periods 1 to n. This is done in step 14.30 by dividing the value of PVMC+ by the number of shares in issue N. In step 14.40 the resultant of step 14.30 is divided by the current share price, determined earlier in step 10.10 in FIG. 10. This gives a ratio of PVMC+ per share to the share price for each of the t periods. Finally, in step 14.50, the resultant is multiplied by 100 to show the percentage mispricing in each of the t periods 1 to n. It can be seen that step 14.20 generates metric 4 of the 24 metrics referred to above, step 14.30 generates metric 5, and step 14.40 generates metric 10.

The results obtained in step 14.50 may be used in a number of ways. They may for example be added together or a mean figure derived for the t periods 1 to n.

FIG. 15 corresponds to FIG. 7 described earlier and illustrates the calculation of aggregate metrics for a group of companies. The routine shown in FIG. 15, may be used to calculate the relative mispricings of a number of companies, based on the calculation made in step 14.50, that calculation being based on Market Capital values.

In step 15.10, a selected metric such as that produced in step 14.50 is retrieved for a number of companies, and in step 15.20 the mean value of this metric is then calculated. In the case of the metric calculated in step 14.40, the result of step 15.20 can be used to indicate the relative mispricing of one company in comparison to a group of companies such as a sector of the market.

FIG. 16 illustrates the use of company and aggregate metrics in a table, and corresponds to the process shown in FIG. 8. In step 16.10 the selected subsidiary valuation metrics, such as the metrics produced in step 14.50 in FIG. 14, are retrieved for a number of companies. In step 16.20 aggregate metrics, such as that produced in step 15.20 in FIG. 15, are also retrieved, and in step 16.30 the retrieved values are sorted and listed in a table or chart.

Thus this preferred embodiment described above with reference to FIGS. 9 to 16 uses the Market Capitalisation alone, instead of a measure of enterprise value, to provide improved or at least an alternative residual income valuation.

Many more specific subsidiary metrics can be developed around EV+ and MC+ concepts. All the metrics can be varied in the manner of their calculation. In particular:

The interest rate used to calculate the Capital charge ("Cost of capital") can be computed in a number of different known ways. For example rates may be computed for whole sectors or countries rather than individual companies. An "internal rate of return" figure may also be used to calculate $K_e$, as shown in step 3.20. These are all examples of numerous alternative known methods.

Enterprise value can be computed in a variety of known ways other than that described in detail above. In particular debt may be valued at book or market value. In addition a number of optional adjustments may be made to the combined figure of debt and equity.

Earnings could be expressed as dividends, profit or cash flow (each of which can be defined in different ways depending on taxation, accounting method and preferred usage of the model).

Present Value (PV) techniques can be applied in various different known ways to "discount" the value of a future sum.

The terminal value can be calculated in a number of different known ways.

In addition to the variety of metrics that EV+ and MC+ allows, they provides analysts with techniques for purposes other than straight forward stock evaluation. The techniques can be used to measure the relative value of different sectors, which aids the asset allocation decisions faced by fund managers, as well as sensitivity analysis of valuation conclusions and to the measurement of the statistical significance of mispricings.

Also, because EV+ and MC+ incorporate forecast of cash flows or earnings, it is possible for analysts to substitute their own in-house forecasts rather than published consensus estimates. This can generate unique insights that other analysts may not have.

Uses

The systems described can be used directly in specialised share information and valuation systems (such as "Estimates Direct" and "Active Express", produced by First Call and I/B/E/S respectively). They can also be used in general investment information systems such as Reuters 3000 Xtra, Bloomberg and Thomson Financial Datastream. They can also be used within similar information systems on the internet or over the media used with mobile telephones employing the WAP (Wireless Application Protocol). The systems can also be used by computerised valuation, trading or fund management systems, such as those used by fund managers, investment bankers and corporate financiers.

Further description of the uses of the invention in value based management are described in "Value Based Management", Gary Ashworth and Paul James, ISBN 0 273 65404 7, published July 2001.

While preferred embodiments of the invention have been described by way of example, it will be appreciated that many changes and modifications may be made to the methods described and illustrated within the scope of the present invention.

TABLE 1

Company A valuation using EV+

|  | Yr1 | Yr2 | Yr3 | PV Total |
|---|---|---|---|---|
| Free cash flow (× $1000) | 140 | 150 | 165 |  |
| Less capital charge at 11% of EV, $0.7 m | (77) | (77) | (77) |  |
| Residual income (RI) stream | 63 | 73 | 87 |  |
| Discount factors @ 11% | 0.901 | 0.812 | 0.731 |  |
| EV + stream (RI × discount factor) | 56.8 | 59.3 | 63.6 | 179.7 |
| Add terminal value profit ($0.9 m – $0.7 m) | — | — | 200 |  |
| Discount factors @ 11% | — | — | 0.731 |  |
| PV (terminal value profit × discount factor) | — | — | — | 146.2 |
| Total under/(over) pricing of company (× $1000) | — | — | — | 325.9 |
| Add current Enterprise Value (× $1000) | — | — | — | 700.0 |
| Estimated true Enterprise Value (× $1000) | — | — | — | 1025.9 |
| Less market value of debt (× $1000) | — | — | — | 200.0 |
| Estimated true value of Equity Capital (× $1000) | — | — | — | 825.9 |
| Number of issued shares | — | — | — | 100,000 |
| Target price per share (Value of equity/issued shares) | — | — | — | $8.26 |

TABLE 2

Company A valuation using EV + (relative values)

|  | Yr1 | Yr2 | Yr3 | PV Total |
|---|---|---|---|---|
| Free cash flow (× $1000) | 140 | 150 | 165 |  |
| Less capital charge at 11% of EV, $0.7 m | (77) | (77) | (77) |  |
| Residual income (RI) stream | 63 | 73 | 87 |  |
| Discount factors @ 11% | 0.901 | 0.812 | 0.731 |  |
| EV + stream (RI × discount factor) | 56.8 | 59.3 | 63.6 | 179.7 |
| EV + per share (EV + /100,000) | $0.57 | $0.59 |  | $0.64 |
| Price/EV + ($5/EV + per share) | 8.8 | 8.5 |  | 7.8 |
| Peer group mean P/EV + | 7.5 | 7.2 |  | 7.6 |
| % difference (Co. A/Peer group) | 17.3 | 18.1 |  | 2.6 |

TABLE 3

Company A calculation of P/EV + G

|  | Yr1 | Yr2 | Yr3 | Mean |
|---|---|---|---|---|
| EV + stream | 56.8 | 59.3 | 63.6 | N/A |
| Growth rate | N/A | 4.4% | 7.3% | 5.8% |
| P/EV + | 8.8 | 8.5 | 7.8 | 8.2 |
| P/EV + G (P/EV + divided by growth) | N/A | 1.9 | 1.1 | 1.4 |

The invention claimed is:

1. A method of determining a measure of residual income in relation to a company or investment, comprising the steps of:
   providing in relation to a company or investment values of market capitalisation (MC) and of debt (VOD);
   determining the forecast earnings or cash flow stream (E) of the company or investment for at least one time period (t) in the future;
   deducting from the value of forecast earnings or cash flow stream (E) obtained a charge (CC) for the cost of capital employed;
   wherein the charge (CC) for the cost of capital employed is based upon a value of enterprise value (EV) and the cost of capital (i), the value of enterprise value (EV) being determined by adding the value of debt (VOD) and adjustments (ADJ), if any, to the current market capitalisation (MC) of the company or investment; and outputting a measure (EV+) of residual income (RI) dependent upon the resultant of the deducting step, where: EV+=E−CC.

2. A method as claimed in claim 1, in which the forecast earnings or cash flow stream comprises free cash flow.

3. A method as claimed in claim 1, in which the charge for the cost of capital employed is obtained by multiplying the value of enterprise value by a cost of capital (i) taken over a period (t).

4. A method as claimed in claim 3, in which the mean interest rate is a function of the cost of equity capital and the cost of debt capital.

5. A method as claimed in claim 4, in which the cost of equity capital is obtained as a weighted combination from the market return ($r_m$) and the risk-free interest rate ($r_f$) determined in accordance with a weighting factor beta ($\beta$).

6. A method as claimed in claim 1, in which the value of debt (VOD) is calculated from the market value of the debt using present value (PV) techniques.

7. A method as claimed in claim 1, further comprising the step of retrieving predefined policies on debt valuation tone used in determining the value of debt.

8. A method as claimed in claim 1, further comprising the step of retrieving predefined policies on adjustments to be made in determining the enterprise value.

9. A method as claimed in claim 1, further comprising the steps of repeating the method for all of a plurality of future time periods.

10. A method as claimed in claim 9, in which the initial value of enterprise value ($EV_0$) is used in the calculation for all the time periods.

11. A method as claimed in claim 9, further comprising the steps of:
    discounting each measure of residual income to present values; and
    summing the plurality of discounted residual income measures thus obtained to provide a summed discounted residual income measure.

12. A method as claimed in claim 10, further comprising the step of adding the summed discounted residual income measure to the initial value of enterprise value.

13. A method as claimed in claim 10, further comprising the step of adding (i) the summed discounted residual income measure (ii) the present value of the difference between a terminal value of the enterprise value and the initial value of enterprise value, and (iii) the initial value of enterprise value.

14. A method of determining a measure of residual income in relation to a company or investment, comprising the steps of:
    providing in relation to a company or investment a value of market capitalisation (MC);
    determining the forecast earnings or cash flow stream (E') of the company or investment for at least one time period (t) in the future after deduction of the interest payable on debt capital; and
    deducting from the value of forecast earnings or cash flow stream obtained a charge (CC') for the cost of equity capital employed;
    wherein the charge (CC') for the cost of equity capital employed is based upon the current market capitalisation (MC) of the company or investment and the cost of equity capital ($K_e$); and
    outputting a measure (MC+) of residual income (RI) dependent upon the resultant of the deducting step, where: MC+=E'−CC'.

15. A method as claimed in claim 14, in which the forecast earnings or cash flow stream comprises free cash flow after deduction of a charge for the interest payable on debt capital.

16. A method as claimed in claim 14, in which the charge for the mean cost of capital employed is obtained by multiplying the market capitalisation value by the cost of equity capital.

17. A method as claimed in claim 14, further comprising the steps of repeating the method for all of a plurality of future time periods.

18. A method as claimed in claim 17, in which the initial value of market capitalisation ($MC_0$) is used in the calculation for all the time periods.

19. A method as claimed in claim 17, further comprising the steps of:
    discounting each measure of residual income to present values; and summing the plurality of discounted residual income measures thus obtained to provide a summed discounted residual income measure.

20. A method as claimed in claim 19, further comprising the step of adding the summed discounted residual income measure to the initial value of enterprise value.

21. A method as claimed in claim 19, further comprising the step of adding (i) the summed discounted residual income measure (ii) the present value of the difference between a terminal value of the market capitalisation and the initial value of market capitalisation, and (iii) the initial value of market capitalisation.

22. Computer apparatus for determining a measure of residual income in relation to a company or investment, comprising:
    input means for providing in relation to a company or investment values of market capitalisation (MC) and of debt (VOD);
    determining means for determining the forecast earnings or cash flow stream (E) of the company or investment for at least one time period (t) in the future;
    deducting means coupled to the determining means and the input means for deducting from the value of forecast earnings or cash flow stream (E) obtained a charge (CC) for the cost or capital employed;
    wherein the charge (CC) for the cost of capital employed used in the deducting means is based upon a value of enterprise value (EV) and the cost of capital (i), the value of enterprise value (EV) being determined by adding the value of debt (VOD) and adjustments (ADJ), if any, to the current market capitalisation (MC) of the investment; and output means coupled to the deducting means for outputting a measure (EV+) of residual income (RI) dependent upon the resultant of the deducting step, where: EV+=E−CC.

23. Computer apparatus for determining a measure of residual income in relation to a company or investment, comprising:
  input means for providing in relation to a company or investment a value of market capitalisation (MC);
  determining means for determining the forecast earnings or cash flow stream (E') of the company or investment for at least one time period (t) in the future after deduction of a charge for the interest payable on debt capital; and
  deducting means coupled to the determining means and to the input means for deducting from the value of forecast earnings or cash flow stream (E') obtained a charge (CC') for the cost of equity capital employed;
  wherein the charge (CC') for the cost of equity capital employed used in the deducting means is based upon the current market capitalisation (MC) of the investment and the cost of equity capital ($K_e$); and
  output means coupled to the deducting means for outputting a measure (MC+) of residual income (RI) dependent upon the resultant of the deducting step, where: MC+=E'−CC'.

24. A computer readable medium storing a computer program adapted when loaded into a computer memory to cause the computer to execute a method in accordance with claim 1.

25. A computer readable medium storing a computer program adapted when loaded into a computer memory to cause the computer to execute a method in accordance with claim 14.

26. A computer readable medium storing a computer program product adapted when loaded into a computer memory to cause the computer to execute a method in accordance with claim 1.

27. A computer readable medium storing a computer program product adapted when loaded into a computer memory to cause the computer to execute a method in accordance with claim 14.

* * * * *